United States Patent
Palmer

(10) Patent No.: US 12,289,332 B2
(45) Date of Patent: Apr. 29, 2025

(54) CYBERSECURITY SYSTEMS AND METHODS FOR PROTECTING, DETECTING, AND REMEDIATING CRITICAL APPLICATION SECURITY ATTACKS

(71) Applicant: CFD Research Corporation, Huntsville, AL (US)

(72) Inventor: Brian Gene Palmer, Huntsville, AL (US)

(73) Assignee: CFD Research Corporation, Huntsville, AL (US)

( * ) Notice: Subject to any disclaimer, the term of this patent is extended or adjusted under 35 U.S.C. 154(b) by 241 days.

(21) Appl. No.: 17/983,048

(22) Filed: Nov. 8, 2022

(65) Prior Publication Data

US 2023/0262077 A1    Aug. 17, 2023

Related U.S. Application Data

(60) Provisional application No. 63/279,541, filed on Nov. 15, 2021.

(51) Int. Cl.
*H04L 9/40* (2022.01)

(52) U.S. Cl.
CPC ...... *H04L 63/1425* (2013.01); *H04L 63/0245* (2013.01); *H04L 63/1416* (2013.01); *H04L 63/1441* (2013.01)

(58) Field of Classification Search
CPC ............ H04L 63/1425; H04L 63/0245; H04L 63/1416; H04L 63/1441; H04L 63/0227
See application file for complete search history.

(56) References Cited

U.S. PATENT DOCUMENTS

| | | | | |
|---|---|---|---|---|
| 6,067,565 A * | 5/2000 | Horvitz | ............. | H04L 67/62 707/E17.107 |
| 6,460,141 B1 * | 10/2002 | Olden | ............. | H04L 63/20 726/13 |
| 6,591,265 B1 * | 7/2003 | Erickson | ............. | H04L 63/102 707/999.005 |
| 7,307,999 B1 * | 12/2007 | Donaghey | ............. | H04L 63/1408 370/465 |
| 7,363,656 B2 | 4/2008 | Weber et al. | | |
| 7,540,029 B1 * | 5/2009 | Saxena | ............. | H04L 51/212 726/23 |

(Continued)

OTHER PUBLICATIONS

Årnes, André & Valeur, Fredrik & Vigna, Giovanni & Kemmerer, Richard. (2006). Using Hidden Markov Models to Evaluate the Risks of Intrusions. 4219. 145-164. 10.1007/11856214_8.

(Continued)

*Primary Examiner* — Aravind K Moorthy
(74) *Attorney, Agent, or Firm* — NEO IP

(57) ABSTRACT

The present invention includes systems and methods for providing cybersecurity to web-enabled applications for protection of critical software and host systems. The present invention is operable to build a Hidden Markov model of an application using automated analysis of code and documentation in order to characterize potential state and state transitions. The present invention is also operable to use additional data such as timing and proximity to assess incoming data. Incoming messages are then assigned a trust score based on Bayesian calculations.

10 Claims, 9 Drawing Sheets

(56) References Cited

U.S. PATENT DOCUMENTS

| | | | |
|---|---|---|---|
| 7,930,256 B2 | 4/2011 | Gonsalves et al. | |
| 8,150,783 B2 | 4/2012 | Gonsalves et al. | |
| 8,296,822 B2* | 10/2012 | Becker | H04L 63/102 726/21 |
| 8,458,795 B2 | 6/2013 | Weber et al. | |
| 8,554,825 B2 | 10/2013 | Falchuk et al. | |
| 8,627,479 B2 | 1/2014 | Wittenstein et al. | |
| 8,756,684 B2 | 6/2014 | Frantz et al. | |
| 8,806,644 B1* | 8/2014 | McCorkendale | H04L 63/1416 713/188 |
| 8,819,851 B1* | 8/2014 | Johansson | H04L 63/0428 726/28 |
| 8,949,941 B2 | 2/2015 | Whelan et al. | |
| 9,053,448 B2 | 6/2015 | Falchuk et al. | |
| 9,071,576 B1* | 6/2015 | Earl | H04L 63/0236 |
| 9,201,131 B2 | 12/2015 | Whelan et al. | |
| 9,210,185 B1 | 12/2015 | Wood et al. | |
| 9,292,545 B2 | 3/2016 | Malik et al. | |
| 9,424,359 B1* | 8/2016 | Ghassemi Hamadani | G06F 16/334 |
| 9,495,635 B2 | 11/2016 | Malik et al. | |
| 9,509,643 B1* | 11/2016 | Gade | H04L 51/52 |
| 9,509,712 B2 | 11/2016 | Wood et al. | |
| 9,571,512 B2 | 2/2017 | Ray et al. | |
| 9,699,205 B2 | 7/2017 | Muddu et al. | |
| 9,749,347 B2 | 8/2017 | Wood et al. | |
| 9,870,470 B2 | 1/2018 | Herwono et al. | |
| 9,898,273 B1* | 2/2018 | Dong | G06F 9/44505 |
| 9,900,332 B2 | 2/2018 | Muddu et al. | |
| 10,235,425 B2 | 3/2019 | Malik et al. | |
| 10,255,124 B1* | 4/2019 | Bellingan | G06F 11/079 |
| 10,303,999 B2 | 5/2019 | Hertz et al. | |
| 10,382,454 B2 | 8/2019 | Avidan et al. | |
| 10,432,648 B1* | 10/2019 | Xu | G06N 20/00 |
| 10,489,439 B2 | 11/2019 | Calapodescu et al. | |
| 10,511,615 B2* | 12/2019 | Ronen | G06N 20/00 |
| 10,650,049 B2 | 5/2020 | Malik et al. | |
| 10,699,076 B2 | 6/2020 | Sun | |
| 10,728,216 B2 | 7/2020 | Galbreath et al. | |
| 10,762,296 B2 | 9/2020 | Sun | |
| 10,785,243 B1* | 9/2020 | Han | G06N 7/01 |
| 10,841,323 B2* | 11/2020 | Sinha | H04L 41/16 |
| 11,003,773 B1* | 5/2021 | Fang | G06N 20/00 |
| 11,050,778 B2 | 6/2021 | Paturi et al. | |
| 11,057,414 B1* | 7/2021 | Giorgio | H04L 63/1416 |
| 11,520,882 B2* | 12/2022 | Giaconi | G06N 3/084 |
| 11,552,975 B1* | 1/2023 | Zhang | H04L 67/125 |
| 11,770,391 B1* | 9/2023 | Bakthavatchalam | G06N 20/00 726/23 |
| 11,973,775 B1* | 4/2024 | dos Santos Lopes | G06F 9/451 |
| 2002/0184354 A1* | 12/2002 | McKenzie | H04L 41/0631 709/223 |
| 2003/0063128 A1* | 4/2003 | Salmimaa | G06F 3/04817 715/810 |
| 2005/0071642 A1* | 3/2005 | Moghe | H04L 63/1416 713/182 |
| 2005/0071643 A1* | 3/2005 | Moghe | H04L 63/1441 713/182 |
| 2005/0235361 A1* | 10/2005 | Alkove | G06F 21/10 705/51 |
| 2005/0251860 A1* | 11/2005 | Saurabh | G06F 21/552 726/23 |
| 2006/0026162 A1* | 2/2006 | Salmonsen | G06F 16/44 |
| 2006/0059568 A1* | 3/2006 | Smith-Mickelson | H04L 63/1441 726/27 |
| 2006/0075132 A1* | 4/2006 | Liu | H04L 65/1101 709/236 |
| 2006/0235933 A1* | 10/2006 | Baluja | H04L 51/226 709/207 |
| 2006/0248340 A1* | 11/2006 | Lee | H04L 63/0428 713/181 |
| 2007/0052586 A1* | 3/2007 | Horstemeyer | G06Q 10/06311 342/457 |
| 2007/0094725 A1* | 4/2007 | Borders | H04L 63/1408 726/13 |
| 2007/0279490 A1* | 12/2007 | Zhou | G06V 20/52 348/143 |
| 2007/0291785 A1* | 12/2007 | Sharma | H04L 41/0886 370/464 |
| 2008/0086600 A1* | 4/2008 | Qiao | G06F 12/0862 711/E12.057 |
| 2011/0093344 A1* | 4/2011 | Burke | G06Q 30/06 705/14.65 |
| 2011/0138467 A1* | 6/2011 | Macwan | G06F 21/554 726/24 |
| 2012/0030734 A1* | 2/2012 | Wohlert | H04W 60/00 726/4 |
| 2012/0082062 A1* | 4/2012 | Mccormack | H04W 48/14 370/254 |
| 2012/0144318 A1* | 6/2012 | Khadilkar | H04L 51/222 715/753 |
| 2012/0159629 A1* | 6/2012 | Lee | G06F 21/566 726/24 |
| 2012/0210417 A1* | 8/2012 | Shieh | H04L 63/0218 726/12 |
| 2013/0031037 A1* | 1/2013 | Brandt | H04L 63/1408 706/12 |
| 2013/0147903 A1* | 6/2013 | Weiser | H04L 65/1069 348/E7.083 |
| 2013/0291088 A1* | 10/2013 | Shieh | H04L 63/0263 726/11 |
| 2013/0303088 A1* | 11/2013 | Watfa | H04W 4/80 455/41.2 |
| 2013/0318492 A1* | 11/2013 | Satyanarayanan | G06F 8/70 717/104 |
| 2013/0326616 A1* | 12/2013 | Planck | H04L 63/1416 726/22 |
| 2015/0244650 A1* | 8/2015 | Yang | H04L 49/552 348/180 |
| 2016/0119187 A1* | 4/2016 | Smith | H04L 41/0813 370/235 |
| 2016/0127402 A1* | 5/2016 | Veeramachaneni | H04L 63/20 726/23 |
| 2016/0352765 A1* | 12/2016 | Mermoud | H04L 63/1458 |
| 2017/0026240 A1* | 1/2017 | Purusothaman | G06F 3/0484 |
| 2017/0046519 A1* | 2/2017 | Cam | G06N 7/01 |
| 2017/0091641 A1* | 3/2017 | Ladha | G06N 7/01 |
| 2017/0272442 A1* | 9/2017 | Klimovs | H04L 63/101 |
| 2017/0279834 A1* | 9/2017 | Vasseur | H04L 43/024 |
| 2017/0289732 A1* | 10/2017 | Guinart | B60C 23/0416 |
| 2017/0302679 A1* | 10/2017 | Caramico | H04L 51/42 |
| 2018/0288126 A1* | 10/2018 | Smart | H04L 69/22 |
| 2019/0026466 A1* | 1/2019 | Krasser | G06N 7/01 |
| 2019/0028489 A1* | 1/2019 | Wang | H04L 63/1425 |
| 2019/0166137 A1* | 5/2019 | Mendes | G06F 21/564 |
| 2019/0173899 A1* | 6/2019 | Tews | H04L 63/1425 |
| 2019/0278777 A1 | 9/2019 | Malik et al. | |
| 2019/0354544 A1 | 11/2019 | Hertz et al. | |
| 2020/0042147 A1* | 2/2020 | Ford | G06F 3/0483 |
| 2020/0120087 A1* | 4/2020 | Sreenivas | H04L 63/0492 |
| 2020/0145447 A1* | 5/2020 | Coffey | H04L 63/1425 |
| 2020/0145448 A1* | 5/2020 | Vu | H04L 43/0888 |
| 2020/0228565 A1* | 7/2020 | Reverte | H04L 43/16 |
| 2020/0279615 A1* | 9/2020 | Kataoka | G16B 30/00 |
| 2020/0293657 A1* | 9/2020 | Chai | G06F 11/3452 |
| 2020/0356663 A1 | 11/2020 | Paturi et al. | |
| 2020/0396244 A1 | 12/2020 | Paturi et al. | |
| 2021/0067531 A1* | 3/2021 | Meir | G06N 20/00 |
| 2021/0185086 A1* | 6/2021 | Zegeye | G06F 18/295 |
| 2021/0200884 A1 | 7/2021 | Anand et al. | |
| 2021/0241554 A1* | 8/2021 | Tzirimis | G07C 9/00309 |
| 2021/0258321 A1* | 8/2021 | Vegulla | G06N 5/04 |
| 2021/0320797 A1* | 10/2021 | Koorella | H04L 9/50 |
| 2021/0377216 A1* | 12/2021 | Cohen | H04L 9/3247 |
| 2021/0385232 A1* | 12/2021 | Kutt | H04L 63/0227 |
| 2021/0390414 A1* | 12/2021 | Schneider | G06N 5/046 |
| 2022/0050697 A1* | 2/2022 | Oesch | G06F 9/455 |
| 2022/0060491 A1* | 2/2022 | Achleitner | H04L 63/1425 |

(56) References Cited

U.S. PATENT DOCUMENTS

| | | | | |
|---|---|---|---|---|
| 2022/0350905 A1* | 11/2022 | Juncker | ............... | G06F 16/1734 |
| 2022/0360453 A1* | 11/2022 | Sun | ........................ | H04L 9/3239 |
| 2022/0385692 A1* | 12/2022 | Kacewicz | ............ | H04L 63/1425 |
| 2022/0407871 A1* | 12/2022 | Soryal | ................. | H04L 63/1466 |
| 2022/0414529 A1* | 12/2022 | Chhibber | ........... | G06Q 10/0635 |
| 2023/0073351 A1* | 3/2023 | Akiva | .................... | G16B 40/00 |
| 2023/0095870 A1* | 3/2023 | Du | ...................... | H04L 63/1416 |
| | | | | 726/23 |

OTHER PUBLICATIONS

Burnwal, Shantanu Prasad (2016) Machine Learning Approaches to Cyber Security. Masters thesis, Indian Institute of Technology Hyderabad, available at https://raiith.iith.ac.in/2651/1/EE14MTECH11037.pdf.

Jiong Yan, Ji Wang and Huo-wang Chen, "Automatic generation of Markov chain usage models from real-time software UML models," Fourth International Conference on Quality Software, 2004. QSIC 2004. Proceedings., 2004, pp. 22-31, doi: 10.1109/QSIC.2004.1357941.

Pooley, Rob. (2008). A Computer Assisted State Marking Method for Extracting Performance Models From Design Models.

Zegeye WK, Dean RA, Moazzami F. Multi-Layer Hidden Markov Model Based Intrusion Detection System. Machine Learning and Knowledge Extraction. 2019; 1(1):265-286. https://doi.org/10.3390/make1010017.

* cited by examiner

```
{"IgnoredMsgs": ["Heartbeat", "Status Report"],
"MarkovModels": {
    "A": [[0.0, 1.0, 0.0],
          [0.0, 0.0, 1.0],
          [0.0, 0.0, 0.0]],
    "B": [1.0, 1.0, 1.0],
    "HMMName": "Customer Withdrawal",
    "HMMActors": [{
        "actor": "Customer",
        "type": "Account Holder"},
        {"actor": "Bank",
        "type": "Teller"}],
    "PI": [1.0, 0.0, 0.0],
    "S": [{"msgtype": "Customer Account Auth",
        "senderActor": ""Customer",
        "receiverActor"; "Bank"},
        {"msgtype": "Withdrawal Request"
        "senderActor": "Customer",
        "receiverActor": "Bank"},
        {"msgtype": "Cash Out",
        "senderActor": "Bank",
        "receiverActor": "Customer"}]},
"ParticipantTypes":[{
    "participant": "John Smith",
    "type": "Account Holder"},
    {"participant": "Jane Doe",
    "type": "Teller"}]}
```

FIG. 7

CYBERSECURITY SYSTEMS AND METHODS FOR PROTECTING, DETECTING, AND REMEDIATING CRITICAL APPLICATION SECURITY ATTACKS

CROSS-REFERENCES TO RELATED APPLICATIONS

This application is related to and claims priority from the following U.S. patents and patent applications. This application claims priority to and the benefit of U.S. Application No. 63/279,541, filed on Nov. 15, 2021, which is incorporated herein by reference in its entirety.

GOVERNMENT RIGHTS

This invention was made with government support under W31P4Q-17-C-0039 awarded by the U.S. Army. The government has certain rights in the invention.

BACKGROUND OF THE INVENTION

1. Field of the Invention

The present invention relates to protecting applications, and more specifically to characterizing programs at the application layer in order to properly detect cybersecurity threats.

2. Description of the Prior Art

It is generally known in the prior art to provide using probabilistic methods to identify cybersecurity threats. It is also generally known in the art to use Hidden Markov models to describe systems with distinct states.

Prior art patent documents include the following:

US Patent Publication No. 2020/0396244 for Complex application attack quantification, testing, detection and prevention by inventors Paturi, et al., filed Jan. 18, 2019 and published Dec. 17, 2020, is directed to an apparatus and method for cyber risk quantification calculated from the likelihood of a cyber-attack on the target enterprise and/or cyber ecosystem based on its security posture. The cyber-attack likelihood can be derived as a probability-based time-to-event (TTE) measure using survivor function analysis. The likelihood probability measure can also be passed to cyber risk frameworks to determine financial impacts of the cyber-attacks. The publication also discloses an apparatus and method (1) to identify and validate application attack surfaces and protect web applications against business logic-based attacks, sensitive data leakage and privilege escalation attacks; and/or (2) that protects web applications against business logic-based attacks, sensitive data leakage and privilege escalation attacks. This can include implementing an intelligent learning loop using artificial intelligence that creates an ontology-based knowledge base from application request and response sequences. Stochastic probabilistic measures are preferably applied to a knowledge base for predicting malicious user actions in real time.

US Patent Publication No. 2020/0356663 for Complex application attack quantification, testing, detection and prevention by inventors Paturi, et al., filed Jul. 17, 2020 and published Nov. 12, 2020, is directed to an apparatus and method for cyber risk quantification calculated from the likelihood of a cyber-attack on the target enterprise and/or cyber ecosystem based on its security posture. The cyber-attack likelihood can be derived as a probability-based time-to-event (TTE) measure using survivor function analysis. The likelihood probability measure can also be passed to cyber risk frameworks to determine financial impacts of the cyber-attacks. The publication also discloses an apparatus and method (1) to identify and validate application attack surfaces and protect web applications against business logic-based attacks, sensitive data leakage and privilege escalation attacks; and/or (2) that protects web applications against business logic-based attacks, sensitive data leakage and privilege escalation attacks. This can include implementing an intelligent learning loop using artificial intelligence that creates an ontology-based knowledge base from application request and response sequences. Stochastic probabilistic measures are preferably applied to a knowledge base for predicting malicious user actions in real time.

US Patent Publication No. 2019/0354544 for Machine learning-based relationship association and related discovery and search engines by inventors Hertz, et al., filed May 24, 2019 and published Nov. 21, 2019, is directed to systems and techniques for determining relationships and association significance between entities. The systems and techniques automatically identify supply chain relationships between companies based on unstructured text corpora. The system combines Machine Learning models to identify sentences mentioning supply chain between two companies (evidence), and an aggregation layer to take into account the evidence found and assign a confidence score to the relationship between companies.

US Patent Publication No. 2019/0278777 for Entity fingerprints by inventors Malik, et al., filed Mar. 18, 2019 and published Sep. 12, 2019, is directed to systems and techniques for exploring relationships among entities. The systems and techniques provide an entity-based information analysis and content aggregation platform that uses heterogeneous data sources to construct and maintain an ecosystem around tangible and logical entities. Entities are represented as vertices in a directed graph, and edges are generated using entity co-occurrences in unstructured documents and supervised information from structured data sources. Significance scores for the edges are computed using a method that combines supervised, unsupervised and temporal factors into a single score. Important entity attributes from the structured content and the entity neighborhood in the graph are automatically summarized as the entity fingerprint. Entities may be compared to one another based on similarity of their entity fingerprints. An interactive user interface is also disclosed that provides exploratory access to the graph and supports decision support processes.

U.S. Pat. No. 9,900,332 for Network security system with real-time and batch paths by inventors Muddu, et al., filed Jun. 7, 2017 and issued Feb. 20, 2018, is directed to a security platform that employs a variety techniques and mechanisms to detect security related anomalies and threats in a computer network environment. The security platform is "big data" driven and employs machine learning to perform security analytics. The security platform performs user/entity behavioral analytics (UEBA) to detect the security related anomalies and threats, regardless of whether such anomalies/threats were previously known. The security platform can include both real-time and batch paths/modes for detecting anomalies and threats. By visually presenting analytical results scored with risk ratings and supporting evidence, the security platform enables network security administrators to respond to a detected anomaly or threat, and to take action promptly.

U.S. Pat. No. 9,870,470 for Method and apparatus for detecting a multi-stage event by inventors Herwono, et al., filed Mar. 31, 2014 and issued Jan. 16, 2018, is directed to a multi-stage event detector for monitoring a system to detect the occurrence of multistage events in the monitored system, the multi-stage event detector including: one or more event detecting detector units for detecting observable events occurring on the monitored system; one or more parameter generating detector units for generating parameter values which vary over time dependent on the behavior of the monitored system; a hidden state determiner for determining a likely sequence of states of interest of the system based on the outputs of the one or more event detecting detector units; and a transition determiner for determining a likely transition occurrence based on a comparison of a set of values of a parameter or set of parameters generated by one or more of the one or more parameter generating detector units with a plurality of pre-specified functions or sets of values of a corresponding parameter or set of parameters associated with different transition occurrences.

U.S. Pat. No. 9,749,347 for Cyber threat monitor and control apparatuses, methods and systems by inventors Pinney, et al., filed Nov. 18, 2015 and issued Aug. 29, 2017, is directed to the cyber threat monitor and control apparatuses, methods and systems ("CTMC") that determine risk across a global Internet network graph model for various virtual or physical network elements. The patent discloses that the CTMC defines a factor mechanism representing interactions among the set of network elements, the factor mechanism including a factor indicative of a correlation between a pair of network elements from the set of network elements, and dynamically calculate the probabilistic network security measure for each network element in the global Internet graph model based at least in part on the factor mechanism and any observed threat indicators related to the global Internet graph model.

U.S. Pat. No. 9,699,205 for Network security system by inventors Muddu, et al., filed Aug. 31, 2015 and issued Jul. 4, 2017, is directed to a security platform that employs a variety techniques and mechanisms to detect security related anomalies and threats in a computer network environment. The security platform is "big data" driven and employs machine learning to perform security analytics. The security platform performs user/entity behavioral analytics (UEBA) to detect the security related anomalies and threats, regardless of whether such anomalies/threats were previously known. The security platform can include both real-time and batch paths/modes for detecting anomalies and threats. By visually presenting analytical results scored with risk ratings and supporting evidence, the security platform enables network security administrators to respond to a detected anomaly or threat, and to take action promptly.

U.S. Pat. No. 9,571,512 for Threat detection using endpoint variance by inventors Ray, et al., filed Dec. 15, 2014 and issued Feb. 14, 2017, is directed to improving threat detection by monitoring variations in observable events and correlating these variations to malicious activity. The techniques can be usefully employed with any attribute or other metric that can be instrumented on an endpoint and tracked over time including observable events such as changes to files, data, software configurations, operating systems, and so forth. Correlations may be based on historical data for a particular machine, or a group of machines such as similarly configured endpoints. Similar inferences of malicious activity can be based on the nature of a variation, including specific patterns of variation known to be associated with malware and any other unexpected patterns that deviate from normal behavior. The patent discloses variations in, e.g., server software updates or URL cache hits on an endpoint, but the techniques are more generally applicable to any endpoint attribute that varies in a manner correlated with malicious activity.

U.S. Pat. No. 9,509,712 for Cyber threat monitor and control apparatuses, methods and systems by inventors Pinney, et al., filed Nov. 18, 2015 and issued Nov. 29, 2016, is directed to cyber threat monitor and control apparatuses, methods and systems ("CTMC") that determine risk across a global Internet network graph model for various virtual or physical network elements. The patent discloses that the CTMC defines a factor mechanism representing interactions among the set of network elements, the factor mechanism including a factor indicative of a correlation between a pair of network elements from the set of network elements, and dynamically calculate the probabilistic network security measure for each network element in the global Internet graph model based at least in part on the factor mechanism and any observed threat indicators related to the global Internet graph model.

U.S. Pat. No. 9,495,635 for Association significance by inventors Malik, et al., filed May 13, 2011 and issued Nov. 15, 2016, is directed to systems and techniques for determining significance between entities. The systems and techniques identify a first entity having an association with a second entity, apply a plurality of association criteria to the association, weight each of the criteria based on defined weight values, and compute a significance score for the first entity with respect to the second entity based on a sum of a plurality of weighted criteria values. The systems and techniques utilize information from disparate sources to create a uniquely powerful signal. The systems and techniques can be used to identify the significance of relationships (e.g., associations) among various entities including, but not limited to, organizations, people, products, industries, geographies, commodities, financial indicators, economic indicators, events, topics, subject codes, unique identifiers, social tags, industry terms, general term/s, metadata elements, classification codes, and combinations thereof.

U.S. Pat. No. 9,292,545 for Entity fingerprints by inventors Malik, et al., filed Aug. 19, 2011 and issued Mar. 22, 2016, is directed to systems and techniques for exploring relationships among entities. The systems and techniques provide an entity-based information analysis and content aggregation platform that uses heterogeneous data sources to construct and maintain an ecosystem around tangible and logical entities. Entities are represented as vertices in a directed graph, and edges are generated using entity co-occurrences in unstructured documents and supervised information from structured data sources. Significance scores for the edges are computed using a method that combines supervised, unsupervised and temporal factors into a single score. Important entity attributes from the structured content and the entity neighborhood in the graph are automatically summarized as the entity fingerprint. Entities may be compared to one another based on similarity of their entity fingerprints. An interactive user interface is also disclosed that provides exploratory access to the graph and supports decision support processes.

U.S. Pat. No. 9,210,185 for Cyber threat monitor and control apparatuses, methods and systems by inventors Pinney, et al., filed Dec. 5, 2014 and issued Dec. 8, 2015, is directed to cyber threat monitor and control apparatuses, methods and systems ("CTMC") that determine risk across a global Internet network graph model for various virtual or physical network elements. The patent discloses that the CTMC defines a factor mechanism representing interactions among the set of network elements, the factor mechanism including a factor indicative of a correlation between a pair of network elements from the set of network elements, and dynamically calculate the probabilistic network security measure for each network element in the global Internet graph model based at least in part on the factor mechanism and any observed threat indicators related to the global Internet graph model.

U.S. Pat. No. 9,201,131 for Secure routing based on degree of trust by inventors Whelan, et al., filed Feb. 3, 2012 and issued Dec. 1, 2015, is directed to a system, method, and apparatus for secure routing based on a degree of trust. The disclosed method involves assigning a level of trust to at least one network node, and utilizing the level of trust to determine a degree of security of the network node(s). The level of trust of the network node(s) is related to an amount of certainty of the physical location of the network node(s). The amount of certainty is attained from the network node(s) being located in a known secure location, and/or from verification of the physical location of the network node(s) by using satellite geolocation techniques or by using network ping ranging measurements. The method further involves utilizing the level of trust of the network node(s) to determine a degree of trust of at least one path for routing the data, where the path(s) includes at least one of the network nodes.

U.S. Pat. No. 9,053,448 for Method for systematic modeling and evaluation of application flows by inventors Falchuk, et al., filed Sep. 4, 2013 and issued Jun. 9, 2015, is directed to a system and method for modeling and evaluating resource requirements of services. The system and method in one aspect enable describing an application session in a software model, for example, as a sequence of events in a sequence diagram, annotating the sequence diagram with information and using the sequence diagram and the information to create a mathematical model such as a Markov model that represents the application session. Once in Markov form the service can be analyzed. The system may include a user interface for allowing a user to enter annotations to the sequence diagram.

U.S. Pat. No. 8,949,941 for Geothentication based on network ranging by inventors Whelan, et al., filed Oct. 27, 2011 and issued Feb. 3, 2015, is directed to a system, method, and apparatus for the authentication of the physical location of a target node. The patent discloses that the authentication of the target node's physical location is achieved by using ping ranging measurements obtained from the amount of time that elapses during ping messages being sent between the target node and at least one trusted node with a known physical location. The physical location of the trusted node(s) is obtained by using satellite geolocation techniques. The accuracy of the ranging measurements may be improved upon by using pre-coordination and/or priority determination of the ping messages being sent between the target node and the trusted node(s). The patent discloses that the ping messages are sent by dedicated ping response hardware that is associated with the target node and/or the trusted node(s). The patent discloses the ping messages include a pseudo random code bit sequence.

U.S. Pat. No. 8,756,684 for System and method for network security including detection of attacks through partner websites by inventors Frantz, et al., filed May 5, 2011 and issued Jun. 17, 2014, is directed to a computer readable storage medium having instructions for execution on a computer. The instructions monitor transactions between a server and a set of clients. An evaluation of session indicators associated with the transactions is performed. Individual sessions between the server and individual clients of the plurality of clients are isolated in response to the evaluation.

U.S. Pat. No. 8,627,479 for System and method for network security including detection of attacks through partner websites by inventors Wittenstein, et al., filed Mar. 1, 2011 and issued Jan. 7, 2014, is directed to a computer readable storage medium with instructions executable on a host computer. The instructions record a relationship between a partner site and the host computer, substitute a reference to the partner site with a partner site alias referencing the host computer, deliver the partner site alias to a client, replace the partner site alias for the reference to the partner site in response to receiving the partner site alias from the client and augment the address of the client with an address alias. The address alias is sent to the partner site. A partner action and the address alias are received from the partner site. The address is exchanged for the address alias. The partner action is delivered to the client utilizing the address. These operations are monitored to identify client activity that constitutes a security threat at the host computer or the partner site.

U.S. Pat. No. 8,554,825 for Method for systematic modeling and evaluation of application flows by inventors Falchuk, et al., filed May 26, 2006 and issued Oct. 8, 2013, is directed to a system and method for modeling and evaluating resource requirements of services. The system and method in one aspect enable describing an application session in a software model, for example, as a sequence of events in a sequence diagram, annotating the sequence diagram with information and using the sequence diagram and the information to create a mathematical model such as a Markov model that represents the application session. Once in Markov form the service can be analyzed. The system may include a user interface for allowing a user to enter annotations to the sequence diagram.

U.S. Pat. No. 8,458,795 for Event detection/anomaly correlation heuristics by inventors Weber, et al., filed Apr. 19, 2008 and issued Jun. 4, 2013, is directed to a system for detecting network intrusions and other conditions in a network. The system includes a plurality of collector devices that are disposed to collect data and statistical information on packets that are sent between nodes on a network. An aggregator device is disposed to receive data and statistical information from the plurality of collector devices. The aggregator device produces a connection table that maps each node on the network to a record that stores information about traffic to or from the node. The aggregator runs processes that determine network events from aggregating of anomalies into network events.

U.S. Pat. No. 8,150,783 for Security system for and method of detecting and responding to cyber attacks on large network systems by inventors Gonsalves, et al., filed Oct. 21, 2010 and issued Apr. 3, 2012, is directed to an improved security system for and method of detecting and responding to cyber attacks on a network or network element. The system comprises: (a) an intelligent agent-based information retrieval subsystem configured so as to automatically search for and retrieve relevant data from distributed sources; (b) a rule-based inferencing mechanism configured so as to interpret retrieved data within the situational context to support event and alert generation for cyber threat assessment and prediction; and (c) a threat assessment and prediction mechanism configured so as to capture relating to the interrelationship between cyber sensor outputs and cyber attacks.

U.S. Pat. No. 7,930,256 for Security system for and method of detecting and responding to cyber attacks on large network systems by inventors Gonsalves, et al., filed May 23, 2007 and issued Apr. 19, 2011, is directed to an improved security system for and method of detecting and responding to cyber attacks on a network or network element. The system comprises: (a) an intelligent agent-based information retrieval subsystem configured so as to automatically search for and retrieve relevant data from distributed sources; (b) a rule-based inferencing mechanism configured so as to interpret retrieved data within the situational context to support event and alert generation for cyber threat assessment and prediction; and (c) a threat assessment and prediction mechanism configured so as to capture relating to the interrelationship between cyber sensor outputs and cyber attacks.

U.S. Pat. No. 7,363,656 for Event detection/anomaly correlation heuristics by inventors Weber, et al., filed Nov. 3, 2003 and issued Apr. 22, 2008, is directed to a system for detecting network intrusions and other conditions in a network. The system includes a plurality of collector devices that are disposed to collect data and statistical information on packets that are sent between nodes on a network. An aggregator device is disposed to receive data and statistical information from the plurality of collector devices. The aggregator device produces a connection table that maps each node on the network to a record that stores information about traffic to or from the node. The aggregator runs processes that determine network events from aggregating of anomalies into network events.

U.S. Pat. No. 11,050,778 for Complex application attack quantification, testing, detection and prevention by inventors Paturi, et al., filed Jul. 17, 2020 and issued Jun. 29, 2021, is directed to an apparatus and method for cyber risk quantification calculated from the likelihood of a cyber-attack on the target enterprise and/or cyber ecosystem based on its security posture. The cyber-attack likelihood can be derived as a probability-based time-to-event (TTE) measure using survivor function analysis. The likelihood probability measure can also be passed to cyber risk frameworks to determine financial impacts of the cyber-attacks. The patent discloses an apparatus and method (1) to identify and validate application attack surfaces and protect web applications against business logic-based attacks, sensitive data leakage and privilege escalation attacks; and/or (2) that protects web applications against business logic-based attacks, sensitive data leakage and privilege escalation attacks. This can include implementing an intelligent learning loop using artificial intelligence that creates an ontology-based knowledge base from application request and response sequences. Stochastic probabilistic measures are preferably applied to a knowledge base for predicting malicious user actions in real time.

U.S. Pat. No. 10,762,296 for Risk address identification method and apparatus, and electronic device by inventor Sun, filed Oct. 4, 2019 and issued Sep. 1, 2020, is directed to a risk address identification method and apparatus, and an electronic device. The risk address identification method includes: acquiring an address word sequence corresponding to an input address; determining an address word in the address word sequence, the determined address word matching a risk word corresponding to a risk address; generating an observation sequence corresponding to the address word sequence according to the determined address word; processing the observation sequence using a Hidden Markov model obtained based on semantics learning before and after address words, to obtain a decision vector, wherein the decision vector represents probabilities of the risk address being matched by address words contained in the address word sequence; and identifying whether the input address is a risk address by making a classification decision on the decision vector.

U.S. Pat. No. 10,699,076 for Risk address identification method and apparatus, and electronic device by inventor Sun, filed Jan. 29, 2020 and issued Jun. 30, 2020, is directed to a risk address identification method and apparatus, and an electronic device. The risk address identification method includes: acquiring an address word sequence corresponding to an input address; determining an address word in the address word sequence, the determined address word matching a risk word corresponding to a risk address; generating an observation sequence corresponding to the address word sequence according to the determined address word; processing the observation sequence using a Hidden Markov model obtained based on semantics learning before and after address words, to obtain a decision vector, wherein the decision vector represents probabilities of the risk address being matched by address words contained in the address word sequence; and identifying whether the input address is a risk address by making a classification decision on the decision vector.

U.S. Pat. No. 10,650,049 for Association significance by inventors Malik, et al., filed Nov. 14, 2016 and issued May 12, 2020, is directed to systems and techniques for determining significance between entities. The systems and techniques identify a first entity having an association with a second entity, apply a plurality of association criteria to the association, weight each of the criteria based on defined weight values, and compute a significance score for the first entity with respect to the second entity based on a sum of a plurality of weighted criteria values. The systems and techniques utilize information from disparate sources to create a uniquely powerful signal. The systems and techniques can be used to identify the significance of relationships (e.g., associations) among various entities including, but not limited to, organizations, people, products, industries, geographies, commodities, financial indicators, economic indicators, events, topics, subject codes, unique identifiers, social tags, industry terms, general term/s, metadata elements, classification codes, and combinations thereof.

U.S. Pat. No. 10,489,439 for System and method for entity extraction from semi-structured text documents by inventors Calapodescu, et al., filed Apr. 14, 2016 and issued Nov. 26, 2019, is directed to a method for extracting entities from a text document including, for at least a section of a text document, providing a first set of entities extracted from the at least a section, clustering at least a subset of the extracted entities in the first set into clusters, based on locations of the entities in the document. Complete ones of the clusters of entities are identified. Patterns for extracting new entities are learned based on the complete clusters. New entities are extracted from incomplete clusters based on the learned patterns.

U.S. Pat. No. 10,382,454 for Data mining algorithms adopted for trusted execution environment by inventors Avidan, et al., filed Sep. 26, 2014 and issued Aug. 13, 2019, is directed to distributed systems for protecting networked computer assets from compromise. The distributed system includes one or more enterprise event sources, such as endpoint(s). The system also includes a server, such as a Big Data Analytics server, and optionally a security management server such as a Security Information and Event Management server. The Big Data Analytics server processes data collected from the enterprise event sources and produces behavioral profile models for each endpoint (or group of similar endpoints). The profiles, models, and ontology analysis are provided to the endpoints. Endpoint analytics use the output from the analytics servers to detect deviations from the endpoint's behavioral profile.

U.S. Pat. No. 10,303,999 for Machine learning-based relationship association and related discovery and search engines by inventors Hertz, et al., filed May 31, 2017 and issued May 28, 2019, is directed to systems and techniques for determining relationships and association significance between entities. The systems and techniques automatically identify supply chain relationships between companies based on unstructured text corpora. The system combines Machine Learning models to identify sentences mentioning supply chain between two companies (evidence), and an aggregation layer to take into account the evidence found and assign a confidence score to the relationship between companies.

U.S. Pat. No. 10,235,425 for Entity fingerprints by inventors Malik, et al., filed Mar. 22, 2016 and issued Mar. 19, 2019, is directed to systems and techniques for exploring relationships among entities. The systems and techniques provide an entity-based information analysis and content aggregation platform that uses heterogeneous data sources to construct and maintain an ecosystem around tangible and logical entities. Entities are represented as vertices in a directed graph, and edges are generated using entity co-occurrences in unstructured documents and supervised information from structured data sources. Significance scores for the edges are computed using a method that combines supervised, unsupervised and temporal factors into a single score. Important entity attributes from the structured content and the entity neighborhood in the graph are automatically summarized as the entity fingerprint. Entities may be compared to one another based on similarity of their entity fingerprints. An interactive user interface is also disclosed that provides exploratory access to the graph and supports decision support processes.

SUMMARY OF THE INVENTION

The present invention relates to protecting web-enabled applications.

It is an object of this invention to use probabilistic models to characterize software applications in order to identify and neutralize threats in incoming data. The present invention is operable to protect web-enabled applications, including, but not limited to, critical applications for security and defense.

In one embodiment, the present invention provides a system for protecting a web-enabled application, comprising, at least one server computer including a processor, a memory, and at least one database, an automated and dynamic access control (ADAC) tool, and at least one scoring engine, wherein the ADAC tool uses at least one module to monitor web/internet traffic, Internet of Things (IoT) traffic, and/or bus traffic, wherein the at least one module includes a proximity module, a temporal module, a command structure module, an operational module, and/or a consistency module, wherein one or more the at least one module is operable to determine at least one trust score for an application and/or incoming data, and wherein the operational module is operable to use a configuration file to create at least one Hidden Markov model (HMM).

In another embodiment, the present invention provides a system for protecting a web-enabled application, comprising, at least one server computer including a processor, a memory, and at least one database, an automated and dynamic access control (ADAC) tool, at least one firewall, and at least one scoring engine, wherein the ADAC tool uses at least one module to monitor web/internet traffic, IoT traffic, and/or bus traffic, wherein the at least one module includes a proximity module, a temporal module, a command structure module, an operational module, a consistency module, and/or a firewall module, wherein the firewall module maintains the at least one firewall, wherein the at least one firewall is implemented at an application layer, a network layer, or a transport layer of the web-enabled application, wherein one or more of the at least one module is operable to determine at least one trust score for an application and/or incoming data, and wherein the operational module is operable to use a configuration file to create at least one Hidden Markov model (HMM).

In yet another embodiment, the present invention provides a method for protecting a web-enabled application, comprising, providing at least one server computer, an automated and dynamic access control (ADAC) tool, and at least one scoring engine, wherein the at least one server computer includes a processor, a memory, and at least one database, wherein the (ADAC) tool monitors web/internet traffic, IoT traffic, and/or bus traffic using at least one module, wherein the at least one module includes a proximity module, a temporal module, a command structure module, an operational module, and/or a consistency module, determining at least one trust score for an application and/or incoming data using one or more of the at least one module, generating an overall trust score using a scoring engine, wherein the overall trust score is based on the at least one trust score, and the operational module creating a Hidden Markov model (HMM) using a configuration file.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 7 illustrates one embodiment of a configuration file.

DETAILED DESCRIPTION

Figure 1:
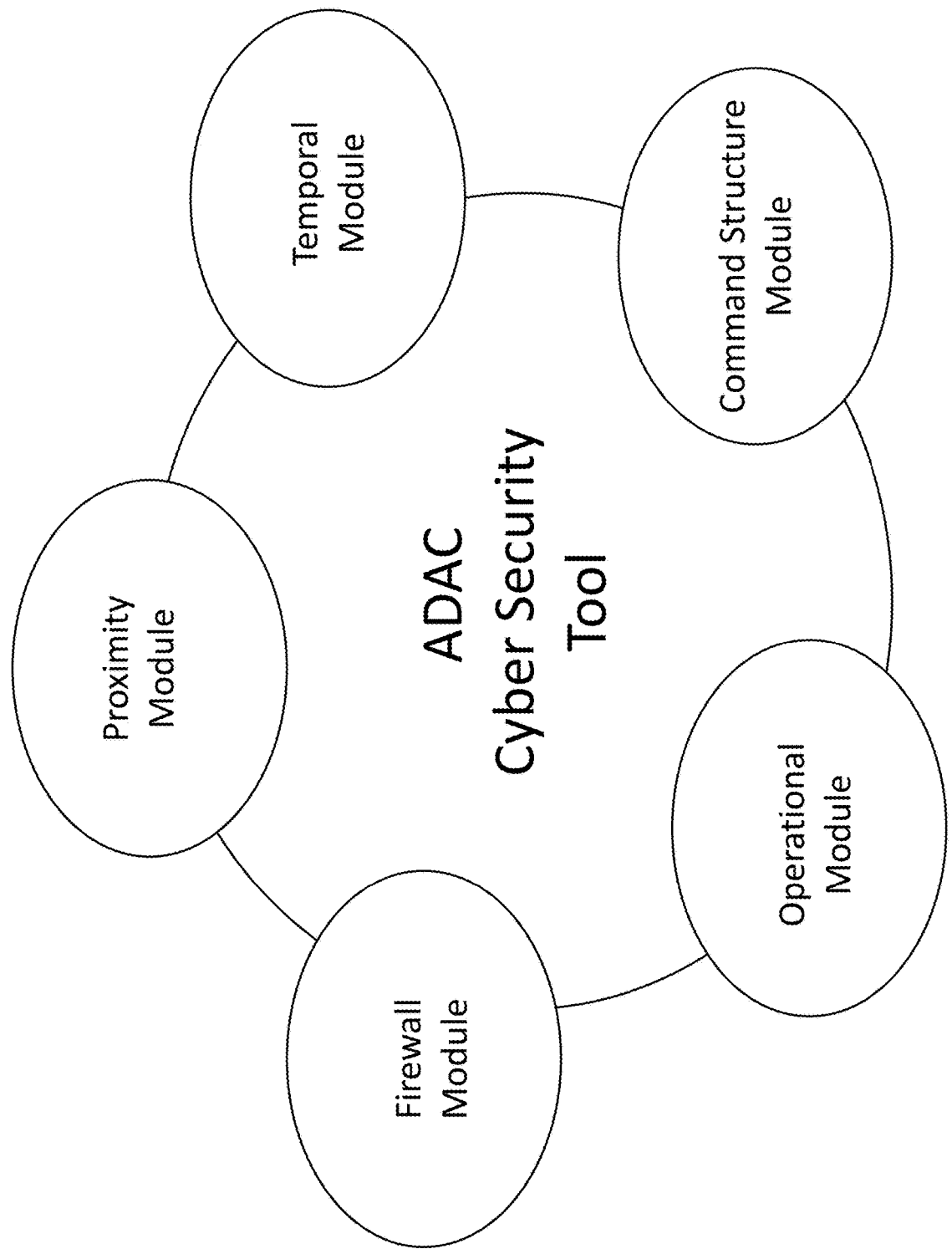
FIG. 1 illustrates one embodiment of the automated and dynamic access control (ADAC) tool of the present invention.

The present invention is generally directed to cybersecurity at the application layer.

In one embodiment, the present invention provides a system for protecting a web-enabled application, comprising, at least one server computer including a processor, a memory, and at least one database, an automated and dynamic access control (ADAC) tool, and at least one scoring engine, wherein the ADAC tool uses at least one module to monitor web/internet traffic, Internet of Things (IoT) traffic, and/or bus traffic, wherein the at least one module includes a proximity module, a temporal module, a command structure module, an operational module, and/or a consistency module, wherein one or more the at least one module is operable to determine at least one trust score for an application and/or incoming data, and wherein the operational module is operable to use a configuration file to create at least one Hidden Markov model (HMM).

In another embodiment, the present invention provides a system for protecting a web-enabled application, comprising, at least one server computer including a processor, a memory, and at least one database, an automated and dynamic access control (ADAC) tool, at least one firewall, and at least one scoring engine, wherein the ADAC tool uses at least one module to monitor web/internet traffic, IoT traffic, and/or bus traffic, wherein the at least one module includes a proximity module, a temporal module, a command structure module, an operational module, a consistency module, and/or a firewall module, wherein the firewall module maintains the at least one firewall, wherein the at least one firewall is implemented at an application layer, a network layer, or a transport layer of the web-enabled application, wherein one or more of the at least one module is operable to determine at least one trust score for an application and/or incoming data, and wherein the operational module is operable to use a configuration file to create at least one Hidden Markov model (HMM).

In yet another embodiment, the present invention provides a method for protecting a web-enabled application, comprising, providing at least one server computer, an automated and dynamic access control (ADAC) tool, and at least one scoring engine, wherein the at least one server computer includes a processor, a memory, and at least one database, wherein the (ADAC) tool monitors web/internet traffic, IoT traffic, and/or bus traffic using at least one module, wherein the at least one module includes a proximity module, a temporal module, a command structure module, an operational module, and/or a consistency module, determining at least one trust score for an application and/or incoming data using one or more of the at least one module, generating an overall trust score using a scoring engine, wherein the overall trust score is based on the at least one trust score, and the operational module creating a Hidden Markov model (HMM) using a configuration file.

None of the prior art discloses using Hidden Markov models to characterize web-enabled applications in order to identify nominal, off-nominal, and untrustworthy behavior. Prior art also does not disclose using a combination of a model used to characterize an application with additional metrics of incoming data in order to determine a trust score for the incoming data. Many cybersecurity systems focus on identifying whether or not incoming data comprises a threat based on content, origin, or metadata. These models require comprehensive knowledge of potential threats in order to best characterize incoming data. However, characterizing application threats is difficult because applications have a large variety of functions, increasing the chance of false positives in unidentifiable or off-nominal behavior. Characterizing an application and each of its potential states is a more effective way of protecting the application because it enables recognition of when an application is entering a harmful state, the effect, regardless of whether the cause is known. Recognizing the harmful state is a more accurate way to secure the application.

Referring now to the drawings in general, the illustrations are for the purpose of describing one or more preferred embodiments of the invention and are not intended to limit the invention thereto.

The systems and methods of the present invention provide cybersecurity for software systems, including Internet of Things (IoT) systems, at the application layer. Physical network connections used to share data in software frameworks present cybersecurity risks. Additionally, network interfaces such as Ethernet, RS-232, BLUETOOTH, WIFI, local area networks (LAN), and other wireless protocols are also vulnerable to host-based infiltration techniques. Wired and wireless networked systems, including critical systems for infrastructure and defense, are under constant threat of disruption. Tailored cybersecurity systems are most effective for protecting networked systems from evolving threats.

Protection of Software Applications

The Open Systems Interconnection (OSI) model is a security framework that abstracts the process of transmitting data between computing systems in a network into seven layers: application, presentation, session, transport, network, data link, and physical. The OSI model is described in the International Organization for Standardization (ISO) and International Electrotechnical Commission (IEC)'s ISO/IEC 7498, which was published in November 1994 and which is incorporated herein by reference in its entirety. Data is received at the application layer and is segmented and/or transformed into various forms (e.g., packets, frames, bits) at each layer until it reaches the physical layer. The physical layer is then responsible for transmitting raw data as a physical signal (e.g., electrical, optical). Each layer of the OSI model must be protected from threats in order for transmission of data to be considered safe. The network layer and the transport layer are common targets of cybersecurity threats such as Internet Protocol (IP) address spoofing, resulting in use of security systems such as Transport Layer Security (TLS), a cryptographic protocol used to secure communications that use Hypertext Transfer Protocol (HTTP). Firewalls are typically implemented at the network layer to monitor incoming and outgoing traffic and implement policies, blacklists, and/or whitelists for blocking threats from accessing the network.

The application layer of a system according to the OSI model is responsible for communicating with user-facing applications and interfacing with HTTP requests. An HTTP request is made by a client (e.g., a web browser) to a host (e.g., a server or machine that hosts at least one website, at least one web application, at least one mobile application, at least one IoT application, etc.) in order to access a resource. The host then returns content to the client in the form of an HTTP response. For example, a GET request is a type of HTTP request that can be used to access a website as identified by a Uniform Resource Locator (URL). The host responds to the GET request by loading the website designated by the URL for the client. A PUT request is a type of HTTP request used to transmit data from the client to the host, e.g., to put the data into a host database. For example, a user submitting a form on a website sends a PUT request containing data from the form. The host then sends an HTTP response confirming receipt of the data. HTTP is described in request for comment (RFC) document RFC 2616 (Hypertext Transfer Protocol—HTTP/1.1), which was published in June 1999 and which is incorporated herein by reference in its entirety.

The application layer is difficult to protect because of the complexity and variety of potential client interactions with and inputs to a host. In addition, the application layer is the most easily accessible to external users. An example of an application layer attack is a distributed denial-of-service (DDoS) attack, wherein a certain functionality of a web site is flooded with requests in order to disable that functionality and/or distract from additional security breaches. Another example of an application layer attack is a Structured Query Language (SQL) injection, wherein code is submitted to the application as a data input that can then be unintentionally executed by the host. Web application firewalls monitor HTTP traffic in order to identify malicious content or intent. Web application firewalls inspect HTTP requests for indicators of a cybersecurity attack and/or suspicious usage patterns and filter out harmful requests. However, the variability in interactions and the specific behaviors of an individual web application that is continuously updated make it difficult for web application firewalls to properly characterize requests, resulting in a high number of false positives. In addition, a web application firewall cannot detect if certain nodes within a network are compromised as a result of a breach of the perimeter of the network, where the private-facing and public-facing sides of the network meet.

Analyzing the behavior and context of a web application through semantic analysis and modeling is an improvement on traditional web application firewalls because it allows for more accurate, customized identification of threats. Identifying threats based on their signatures or origins is effective for repeated or easily recognizable threats. However, staying up-to-date with new threats requires a constantly learning and evolving system that is operable to accurately categorize each incoming request. Implementing this type of security is not practical in environments with limited internet connection or processing power, or environments where security software cannot be frequently updated. Internet or cloud connectivity for the purposes of cybersecurity enables the introduction of threat vectors to a computing system.

Due to the limitations of present methods for monitoring web application traffic for malicious behavior, there is a long-standing, unmet need for systems and methods that accurately characterize an application and its potential states in order to detect threats to the application or its hosts. The systems of the present invention take advantage of code and documentation, which are present with almost every software system, to build models that accurately characterize an application in order to identify when incoming data (e.g., messages) are attempting to harm the application or its host(s). The present invention is operable to recognize when incoming data will result in abnormal application behavior and assign at least one trust score to the incoming data. The system is then operable to determine whether or not to allow the incoming data to reach the application based on the at least one trust score. The application characterization enables the present invention to detect zero-day threats that would otherwise go undetected due to their ability to take advantage of code vulnerabilities. The present invention is also operable to detect threats without using pattern matching of incoming data. In an example embodiment, the system of the present invention is operable to be implemented in a defense system, e.g., a missile and fire control system. Military systems often have very robust documentation that describes in detail each mechanism and pathway of the system. The system of the present invention is operable to use the documentation to build equally robust models that describe the military systems and enable cybersecurity actions.

In one embodiment, the present invention provides an automated and dynamic access control (ADAC) tool for an application (e.g., a software application, a web application). In one embodiment, the present invention includes an operational module, a command structure module, a temporal module, a consistency module, and/or a proximity module. In one embodiment, the present invention further includes at least one firewall maintained by a firewall module. FIG. 1 illustrates an example embodiment of the present invention wherein the ADAC tool uses a plurality of modules to provide cybersecurity. The present invention is operable to use at least one of the modules to determine a trust score for an application and/or incoming data in real time or near real time. The operational module uses at least one Hidden Markov model (HMM) in order to determine whether an incoming message to a web application is a threat based on the present state of the web application. The temporal module creates at least one model of synchronous messages in order to detect when intrusions disrupt timed processes. The proximity module monitors proximity between a host and a client to identify access patterns. The consistency module uses inputs received from a user device to specify the rules containing the specification of byte offsets and lengths within specific message types to check for static or dynamic consistency. In one embodiment, the present invention further includes at least one firewall, wherein the at least one firewall is operable to be implemented at the application layer, the network layer, or the transport layer. In one embodiment, a scoring engine of the present invention is operable to determine at least one trust score for each event. In one embodiment, the at least one trust score is determined based on at least one individual score, e.g., a score generated by the operational module. The at least one trust score is used to determine whether or not the event is acceptable or a threat. In one embodiment, the system of the present invention is operable to be integrated into an existing cybersecurity system and/or pipeline.

Figure 2:
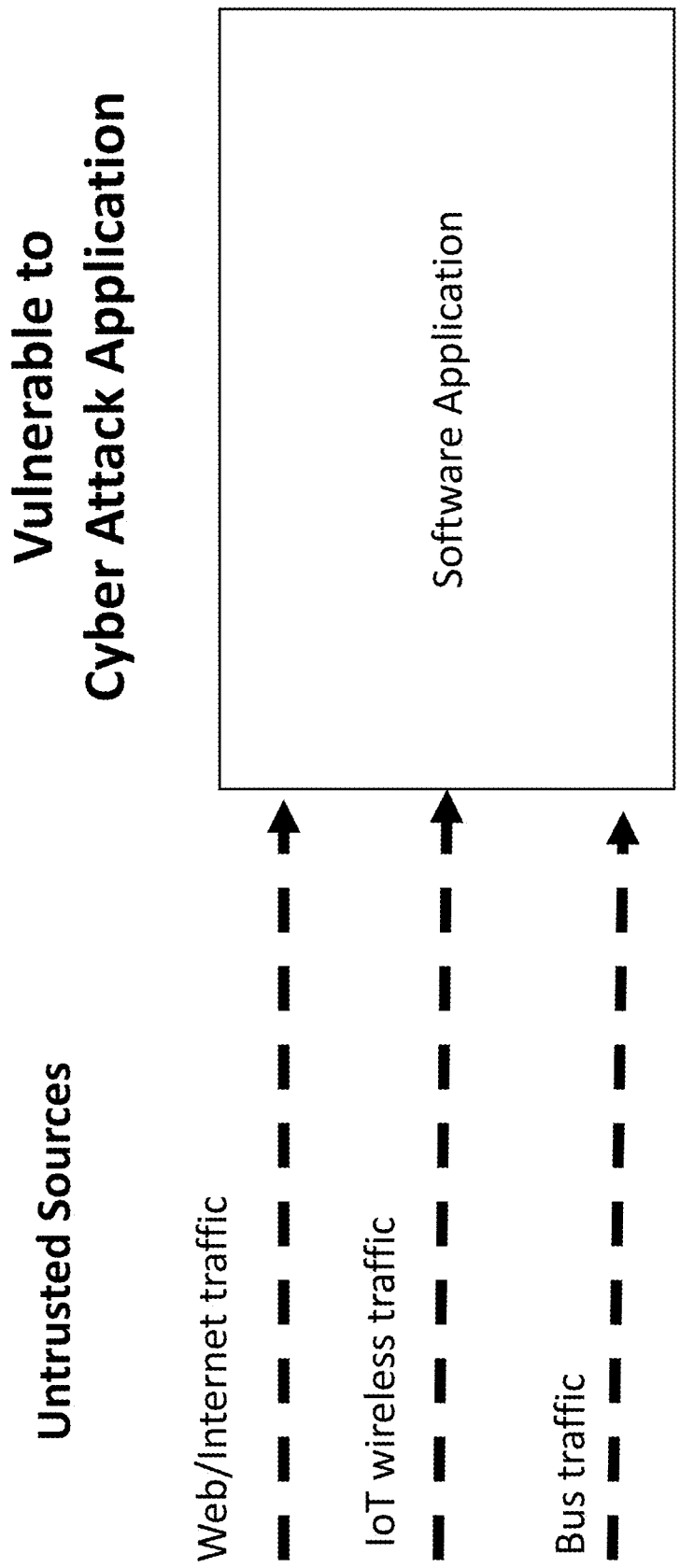
FIG. 2 illustrates an example of an unprotected software application.
Figure 3:
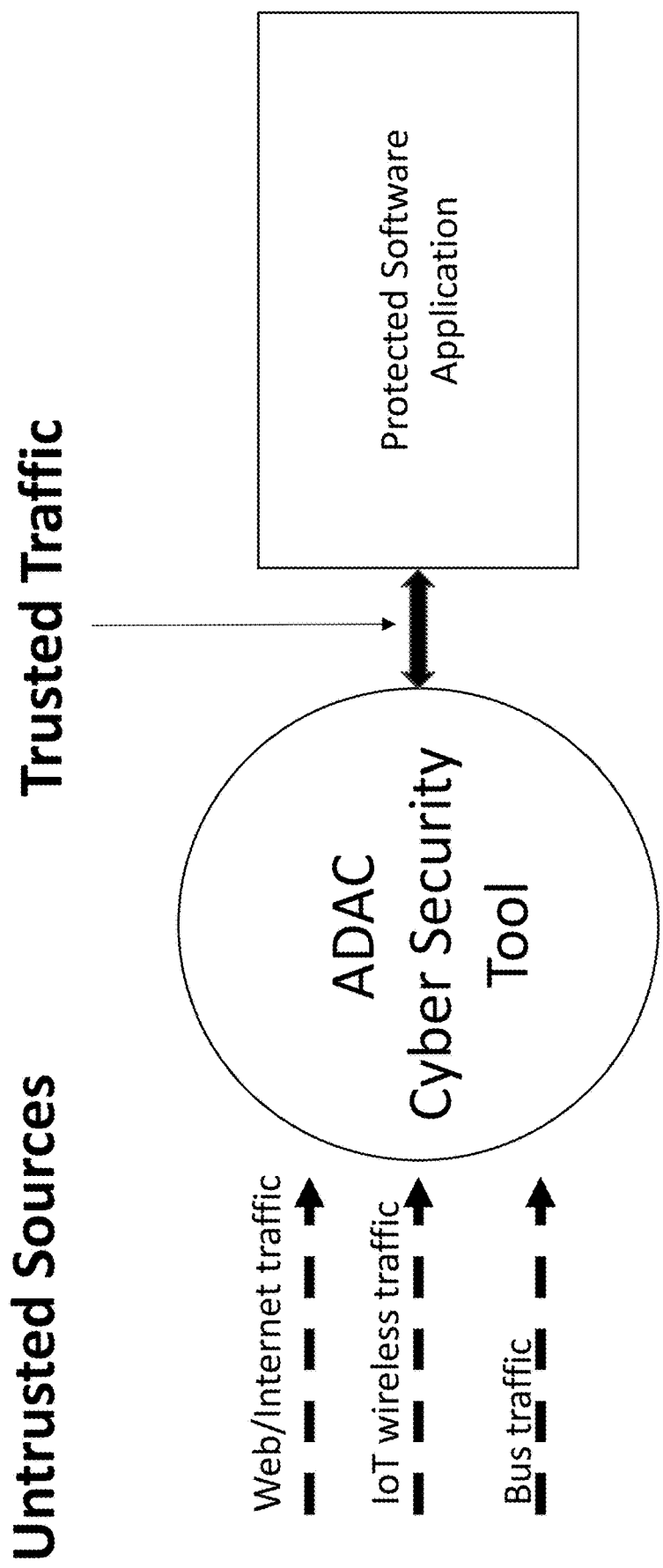
FIG. 3 illustrates one embodiment of the ADAC tool protecting a software application.

FIG. 2 illustrates an example of an unprotected software application, which is vulnerable to cyber attacks from untrusted sources. The ADAC tool monitors traffic, including, but not limited to, web/internet traffic, IoT traffic, and/or bus traffic (e.g., over an Ethernet connection) and only allows trusted traffic to reach a protected application. FIG. 3 illustrates an example embodiment wherein the ADAC tool is positioned between the untrusted sources and the application. In one embodiment, the security system of the present invention is operable to be integrated into an existing application layer security system (e.g., a web application firewall, a runtime application self-protection (RASP) system). The system of the present invention is operable to execute as part of a security pipeline in an initial step, a middle step, and/or a final step. In one embodiment, the security system is operable to communicate with external security systems in order to provide more robust protection of an application.

Operational Module

Figure 4:
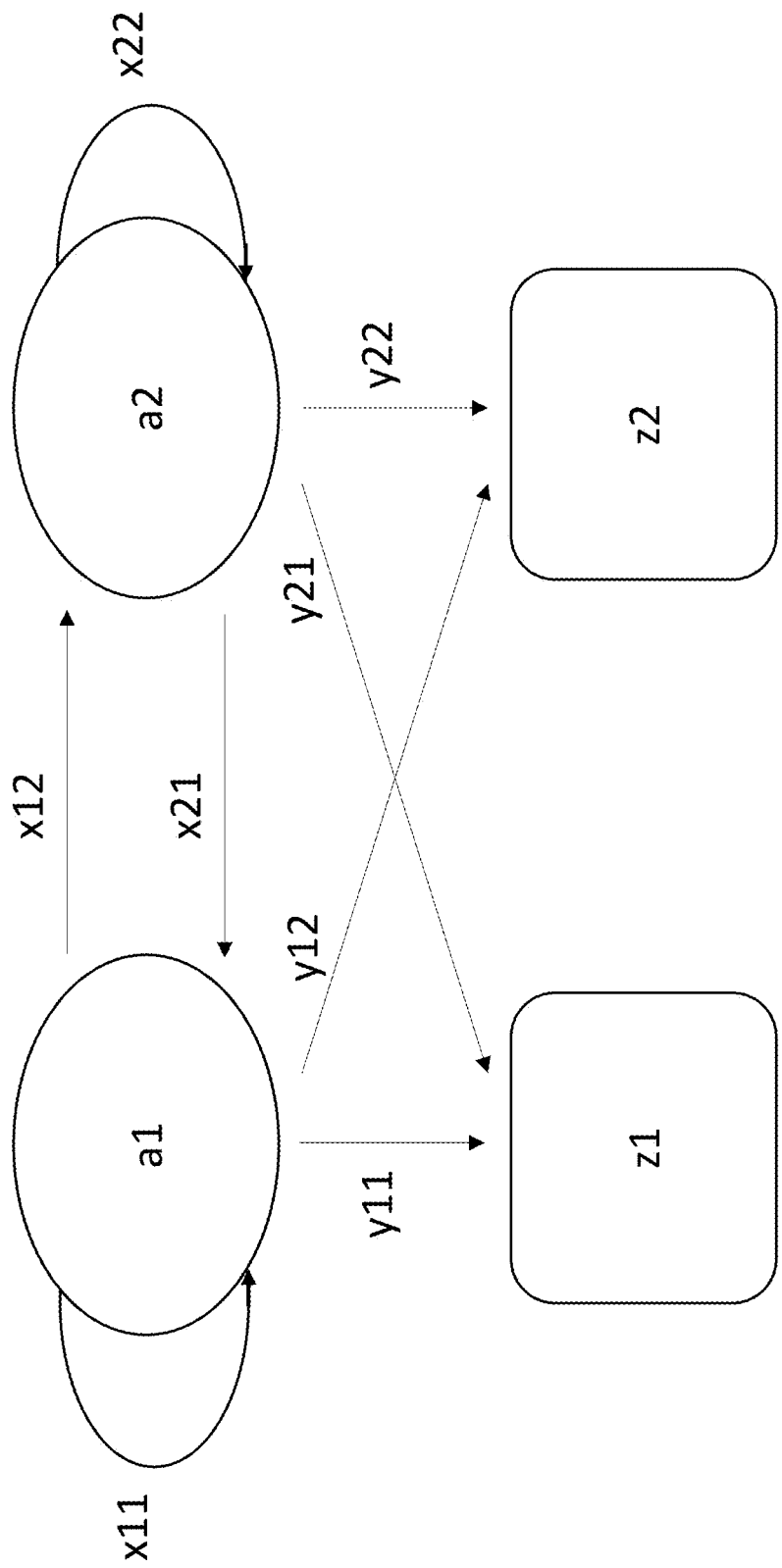
FIG. 4 illustrates one embodiment of a Hidden Markov model.

Hidden Markov models (HMIs) describe a system wherein an observable outcome is influenced by an unobservable outcome. The unobservable outcome is a result of a Markov process, wherein a present outcome at step n is only dependent on the outcome directly before it, step (n−1). All of the steps before (n−1) do not affect the present step n. For each observable outcome, there is a probability that the observable outcome is a result of a certain unobservable outcome. Building a Markov model requires knowing each possible outcome (state) and the probability that an outcome at step (n−1) will lead to step n for each possible outcome, also known as a state transition. The Markov model also requires initial state probabilities wherein the initial state probabilities describe the likelihood of the system starting in each state. In addition, building a Hidden Markov model requires knowing the probabilities of each unobservable outcome leading to an observable outcome. FIG. 4 illustrates an example of a system that is operable to be described by a Hidden Markov Model. There are two unobservable states, a1 and a2. When the present state is a1, there is a probability of x11 that the next state will also be a1 and a probability of x12 that the next state will be a2. The sum of the probabilities x11 and x12 will necessarily be equal to 1. When the present state is a2, there is a probability of x22 that the next state will also be a2 and a probability of x21 that the next state will be a1. The state before the present state has no effect on the next state. The unobservable states of a1 and a2 cause an observable state, either z1 or z2. If the observable state $n_o$ is z1, the probability of the unobservable state $n_u$ being a1 is y11 and the probability of the unobservable state $n_u$ being a2 is y21. Alternatively, if the observable state $n_o$ is z2, the probability of the unobservable state $n_u$ being a1 is y12 and the probability of the unobservable state $n_u$ being a2 is y22.

In one embodiment, the operational module of the present invention builds at least one HMM to characterize all possible states of an application, e.g., a web application. In one embodiment, the observable states of the web application are the messages received by the application, e.g., HTTP requests. Each message is indicative of a hidden intent or process; however, the operational module does not necessarily have initial access to that process because it occurs externally. Thus, in one embodiment, the operational module is operable to determine the hidden process (e.g., a malicious process) based on the observable states. In one embodiment, the at least one HMM includes a Bakis HMM. Bakis Hidden Markov models are often used to model temporal processes in which the system only progresses in one direction (also known as left-to-right Markov models) and cannot transition from a later state back to an earlier state. Alternative left-to-right Markov models, such as a Markov model with parallel left-to-right paths, are also compatible with the present invention. In one embodiment, the at least one HMM describing a process only has one possible final state.

In one embodiment, the operational module is operable to determine that an incoming message to the application is malicious based on the at least one HMM. The at least one HMM describes incoming and outgoing messages to the application based on desired functionality of a message with respect to the application, as described in a sequence diagram, code documentation, and/or the code itself. Example functionalities include, but are not limited to, requests for data and insertion of data into a database. The at least one HMM captures the probability of each request or response leading to a subsequent request or response. Thus, abnormal requests and/or responses that result from malicious interaction with the application are easily identified because they do not follow the known Markovian processes described by the HMM. In one embodiment, the operational module includes a semantic reasoning engine, wherein the semantic reasoning engine is operable to determine the probabilities for each state transition by learning from the documentation and/or behavior of the web application.

There are many possible states for a web application, including edge cases and off-nominal behavior or states. In one embodiment, the at least one HMM is a plurality of HMMs, wherein each of the plurality of HMMs describes a different branch of web application behavior. In one embodiment, the plurality of HMMs is chained together to describe the web application transitioning from a first category of states to a second category of states. For example, a web application in a first state has a plurality of likely next states. However, a certain action on the web application (e.g., a navigation to a different webpage) results in the web application transitioning to a second state, wherein the plurality of likely next states following the second state is different from the plurality of likely next states following the first state. The operational module is operable to build two separate but linked HMMs to illustrate the change in likely next states. In one embodiment, the operational module is operable to graft a first HMM into a second HMI to describe a complete process. In one embodiment, the operational module is operable to create at least one HMM to describe off-nominal behavior in order to properly identify the state of the web application even in unexpected or uncommon situations. Capturing off-nominal behavior and edge cases in a state model reduces the likelihood of false positives when detecting cybersecurity threats. In one embodiment, the off-nominal behavior is modeled as a branch off of a main HMI. Examples of off-nominal behavior include, but are not limited to, data input outside of an expected range, data input of an unexpected or incorrect format (e.g., letters instead of numbers), lack of input, unexpected input, a dropped connection, unexpected access origin, and unexpected latency. The operational module is operable to combine nominal and off-nominal state models to represent an operational process using a Markov Model. Advantageously, Hidden Markov Models in particular are robust for modeling application processes with nominal and off-nominal transitions.

Figure 5:
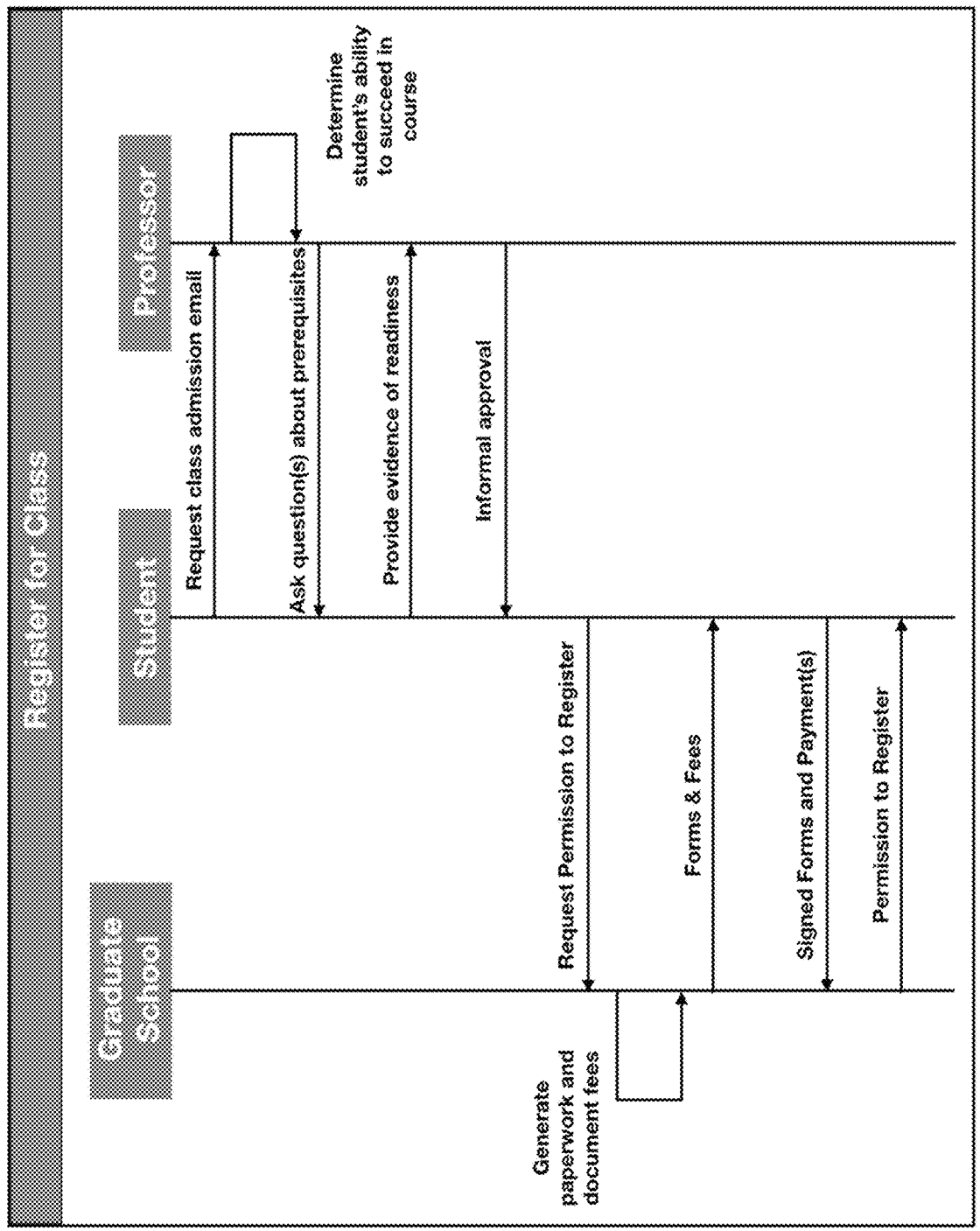
FIG. 5 illustrates one embodiment of a Unified Markup Language (UML) sequence diagram.
Figure 6:
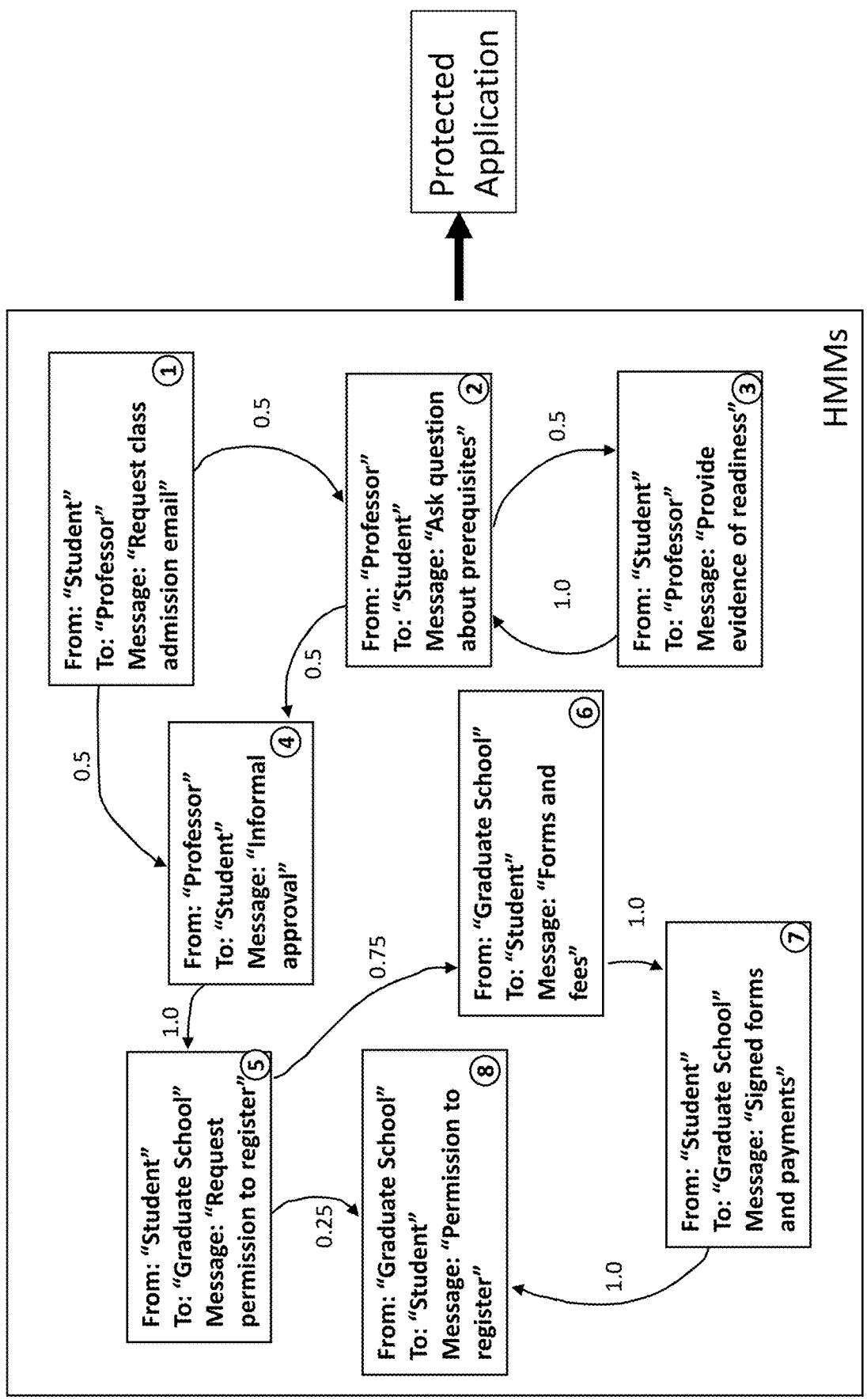
FIG. 6 illustrates one embodiment of a Hidden Markov model created based on an UML sequence diagram.

In one embodiment, the operational module is operable to build the at least one HMI using a sequence diagram, e.g., a sequence diagram in Unified Markup Language (UML). UML sequence diagrams illustrate ordered processes between multiple objects or parties. These diagrams are effective for describing web applications because they show how objects or parties communicate with each other and the purpose of each communication in a sequence. FIG. 5 illustrates an example embodiment of a UML sequence diagram describing the process for registering for a class. The diagram shows the requests and responses that are made between three different parties wherein the requests and responses are visually depicted in order from the top of the diagram to the bottom of the diagram, with the first state being the highest left-most state and the final state being the lowest right-most state. FIG. 6 illustrates an example embodiment of a Markov model created based on the UML sequence diagram of FIG. 5. Each message (e.g., a request and/or a response) is depicted as a state in the Markov model. The ordered sequence of events illustrated by the UML diagram informs the transitions between states in the Markov model. In one embodiment, the transition probabilities are based on historical data. In one embodiment, the transition probabilities are initialized using expected activity of the web application and continuously updated based on new activity. Alternatively, the transition probabilities are initialized such that each next state in the model has an equal probability of occurring. In yet another embodiment, the transition probabilities are initialized with either 1.0 or 0.0 (e.g., using an identity matrix). In one embodiment, the probabilities of the at least one HMM are updated over time. In a preferred embodiment, the operational module is operable to build the at least one HMM in an automated process. In one embodiment, the operational module uses the King and Pooley State Marking approach to generate the at least one HMM as described in *A Computer Assisted State Marking Method for Extracting Performance Models from*

*Design Models* by Abdullatif, et al., which was published in January 2008 and which is incorporated herein by reference in its entirety. An alternate method for generating the at least one HMM is described in *Automatic Generation of Markov Chain Usage Models from Real-time Software UML Models* by Yan, et al., which was presented in September 2004 and which is incorporated herein by reference in its entirety.

In another embodiment, the operational module is operable to build the at least one HMM using code documentation and/or architecture descriptions. Documentation within code and separate documentation (e.g., in a separate Portable Document Format (PDF) file) are both compatible with the present invention. In one embodiment, the operational module executes a PDF parser, wherein the PDF parser is operable to recognize and extract data (e.g., text, metadata) from a PDF file. In one embodiment, the operational module is operable to analyze the documentation and build the at least one HMM in an automated process without user input. In one embodiment, the operational module is operable to perform pattern recognition on the code documentation to recognize when states and transitions between states are described. Pattern recognition is useful when the code documentation is written in an unstandardized format that does not clearly indicate each individual state of the web application and its potential next steps. The operational module is operable to recognize uniformities in the syntax of the code documentation even if the code documentation is not written in a standardized format. In an alternative embodiment, the operational module is operable to analyze the code itself to build the at least one HMI. The operational module is operable to analyze in-line documentation (e.g., comments) as well as the code itself to recognize patterns, uniformities, and other indicators that describe the potential states of the web application. Advantageously, using documentation or source code enables the operational module to update its models when the software updates. Additionally, using documentation or source code eliminates the need for external access to and interaction with operators or users.

Figure 8:
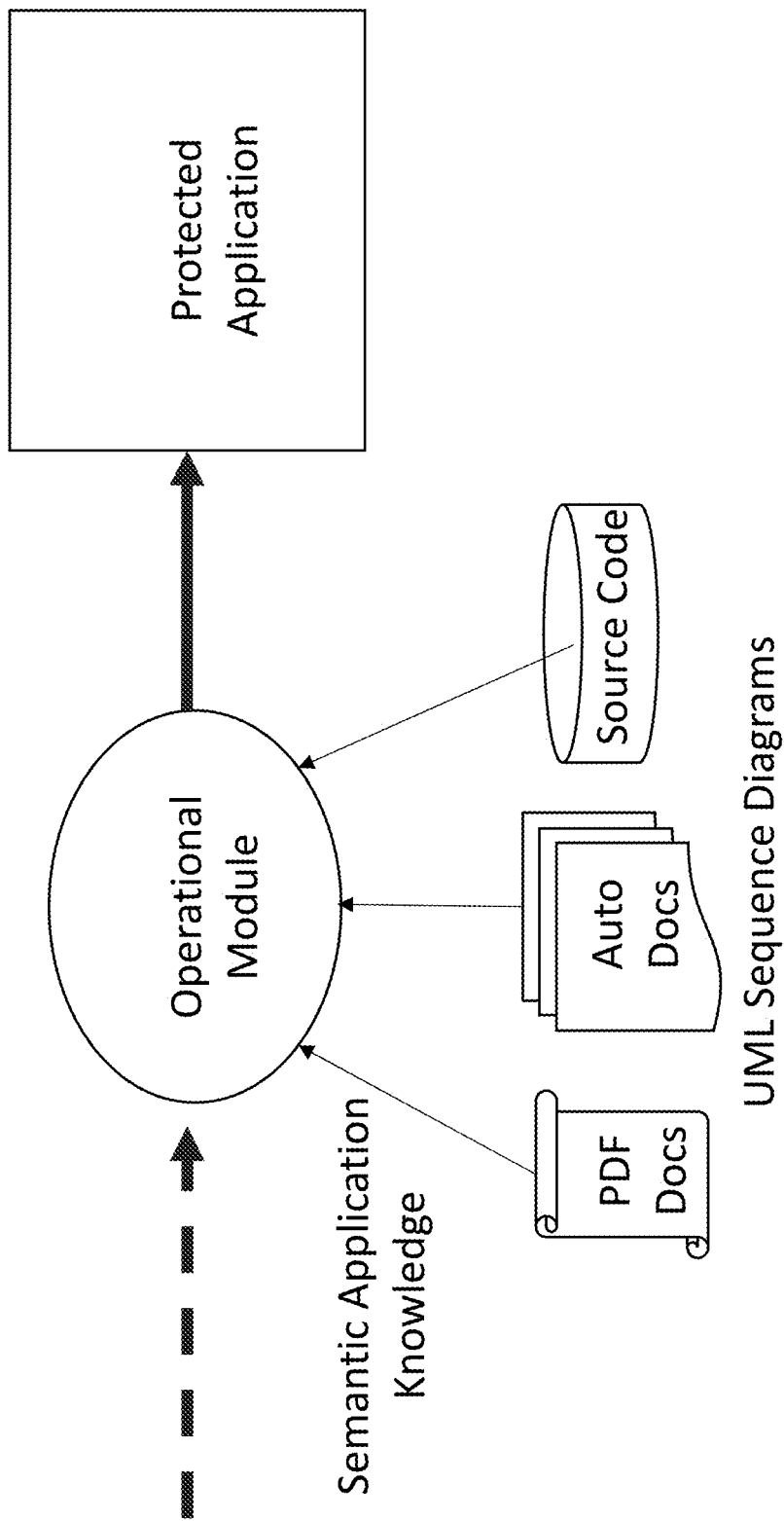
FIG. 8 illustrates one embodiment of an operational module of the present invention.

In yet another embodiment, the operational module is operable to use a configuration file to build the at least one HMI. FIG. 7 illustrates an example embodiment of a configuration file. The configuration file includes, but is not limited to, a name of the at least one HMI, a list of actors, a list of participant types, a list of states, a list of state transition probabilities, a list of observation probabilities, and/or a list of initial state probabilities. In one embodiment, the configuration file also includes states (e.g., message types) that the system should ignore. As a non-limiting example, the contents of periodic messages such as status reports or heartbeat messages are not relevant to a present state of a web application. However, temporal analysis of periodic messages is still useful for threat detection. In one embodiment, the configuration file includes data for a plurality of branched HMIs. In one embodiment, the system includes a user interface (e.g., graphical user interface) to accept, build, and/or update the configuration file. FIG. 8 illustrates an embodiment of the operational module wherein semantic analysis is applied to PDF documentation, automatic documentation, source code, and/or UML sequence diagrams in order to characterize and protect the web application.

In one embodiment, the operational module maintains an ongoing list of active current processes and their corresponding HMIs while monitoring the web application. When the web application attempts to reach a new state (e.g., via a request), the operational module determines whether the new state is a possible state in the current list of ongoing processes. In one embodiment, the request and corresponding state is identified by a sender, a receiver, and a message type. If the new state is a possible state, the operational module gives the request a trust score corresponding to the probability of the ongoing process reaching the new state and increments the corresponding process to the new state. If the new state is not a possible state but is an initial state for a new process that is not on the list of current processes, the operational module adds the new process to the list of current processes with the new state as the initial state of the new process and gives the request a trust score corresponding to the probability of the initial state being the new state. In one embodiment, the new state is identified as an initial state based on a sender type, a receiver type, and/or a message type. In one embodiment, if there are multiple processes with the same initial state that matches the new state, the operational module chooses the process with the highest probability of the new state being the initial state. In one embodiment, if the new state is not a possible state and is also not an initial state for a new process, the operational module gives the request a trust score of zero. Alternatively, the operational module raises a security flag and/or sends an alert to an administrator.

In one embodiment, the operational module is operable to use semantic analysis and/or contextual analysis to characterize an input (e.g., a message, a request). In one embodiment, the semantic and/or contextual analysis includes natural language processing (NLP) for text analysis. Semantic and/or contextual analysis enables the system to understand the purpose of an incoming message based on its content as well as metadata including, but not limited to, a sender, a recipient, and/or a timing. These steps are useful when the input is a potential next state for multiple active processes. Initialization sequences and periodic update messages are examples of inputs that may belong to multiple processes. The operational module is operable to determine the process that the input corresponds to and advance that process using semantic and/or contextual analysis of the input and the active processes. In an alternative embodiment, the operational module is operable for multiple hypothesis modeling, when multiple state transitions and/or active processes are maintained based on new data until a discriminating decision can be made. For example, an input message could be a next step for a plurality of processes. The operational module increments each of the plurality of processes to their respective next steps until new data is received that enables the operational module to decide which of the plurality of processes is actually being executed. In one embodiment, the operational module assesses the risk of maintaining multiple hypotheses when determining whether or not it should choose a single transition and/or process. For example, if one of the potential processes represents a serious cybersecurity threat, the operational module calculates a risk of letting the threat go unchecked while maintaining the process as one of multiple potential processes. In one embodiment, the operational module uses a multiple hypothesis tracking algorithm, which is a type of breadth-first search algorithm to eliminate hypotheses with new data. In one embodiment, the operational module maintains a multi-hypothesis group of processes wherein each process in the group of processes is advanced based on highest probabilities as determined by the Viterbi algorithm. When discriminating evidence is received that enables the operational module to determine which is the correct process in the group of processes, the non-viable processes in the multi-hypothesis group are stopped. In one embodiment, the operational module is operable to collect and analyze incremental evidence (e.g., requests, states) over time until the incremental evidence enables discrimination between the group of processes.

In one embodiment, the operational module uses the Viterbi algorithm to determine an operational trust score for a request based on the at least one HMM. The Viterbi algorithm is described in *The Viterbi Algorithm*, a publication by Forney in the Proceedings of the Institute of Electrical and Electronics Engineers (IEEE), Vol. 61, Issue 3, which was published in March 1973 and which is incorporated herein by reference in its entirety. The operational trust score represents a probability of trust for a potential state transition. In one embodiment, the operational trust score is a cumulative probability of transitioning from the initial state of a process to each subsequent state in the process. The operational trust score thus uses previous state data. The Viterbi algorithm is a recursive method that takes the most probable path for reaching each state in a sequence of states in order to determine the probability of a next state. Given that the model is a Hidden Markov model, the Viterbi algorithm is used to determine a trust score representing the probability of a hidden state (e.g., a threat) given the observed states. Alternative methods for determining an operational trust score include, but are not limited to, iterative Viterbi decoding, posterior decoding, and best paths algorithms. In one embodiment, the operational module suggests corrective actions based on the identified process and the operational trust score.

In one embodiment, the present invention includes a command structure module wherein the command structure module is operable to determine an echelon chain of command for messages. In one embodiment, the command structure module includes a semantic analyzer and/or a semantic reasoner to determine the chain of command. In one embodiment, the command structure module is operable to parse the chain of command, e.g., from header information, from routing information. The command structure module is operable to compare an observed chain of command of an incoming message or its source to an expected chain of command. An unexpected chain of command is considered untrustworthy, and the command structure module calculates a command structure trust score based on the deviation of the observed chain of command from the expected chain of command.

In one embodiment, the present invention includes a consistency module, wherein the consistency module uses inputs received from a user device to specify the rules containing the specification of byte offsets and lengths within specific message types to check for static or dynamic consistency. This enables user accounts to verify that dynamic data (e.g., time) change from message to message or to verify that values stay the same once they are set. The consistency module contains rule specifications including, but not limited to, attributes related to message type, parameters (e.g., names, consistency type, offset, length), participants (e.g., sender, recipient, type), and/or consistency checking specifications (e.g., related to message type, participant type, attributes). Advantageously, the consistency module enables the system of the present invention to reuse rules and participants for different configurations.

Advantageously, the operational module of the present invention characterizes a system at the application layer (e.g., a web application) without needing information about external systems or clients interacting with the web application. Therefore, the operational module is operable to build an accurate model of the system before it is live. Additionally, the operational module is operable to capture edge cases and off-nominal behavior and recognize such behavior even when it is encountered for the first time during live operation. Characterizing an application rather than incoming threats means that the operational module is operable to detect unsafe requests even if the requests originate from unfamiliar actors or have unfamiliar characteristics, e.g., signatures.

Another advantage of characterizing the application is that the security system of the present invention does not need to learn from incoming threats. Implementing machine learning or similar systems into a security system requires processing power and/or internet connectivity in order to ensure that the system is continuously learning and updating with a robust model, e.g., a neural network. It is impractical to implement these models in environments that do not meet the hardware requirements for running machine learning in addition to security monitoring activities. Many systems use remote resources such as AMAZON Web Services (AWS), which provides cloud-based server environments, for running machine learning models. While these remote resources enable a system to offload processing, the required connectivity is an additional vulnerability of the system as a threat vector could infiltrate the connection and cause harm to the system. In addition, interruptions and latency in the internet connection, whether purposeful or accidental, can cause a model that depends on external resources to become outdated or ineffective. Finally, machine learning models require large amounts of training data in order to accurately assess incoming threats. Training data does not always exist for new systems or systems that are deployed in specific environments. It is possible that a web application does not receive a large amount of regular traffic but still requires a very accurate security system. Incomplete training data that does not include enough examples of rare risk scenarios results in an inaccurate model, which can have devastating results for a system. Unlike a neural network, which is typically constructed with at least one adjustable element of randomness, the at least one HMM built by the operational module of the present invention is deterministic, thus eliminating uncertainty and inefficiency in adjusting the model to properly learn from data. The modern agile and scrum development processes result in frequent updates to software systems which may introduce new vulnerabilities. An automated HMI module keeps perfectly up to date with the new system, while a generic web application firewall does not and machine learning approaches may take a lot of time to reestablish.

Temporal Analysis

In one embodiment, the temporal module of the present invention is operable to model timing of digital messages, e.g., from a client to a host. In a preferred embodiment, the temporal module models periodic messages, which occur at regular intervals. Examples of periodic messages include, but are not limited to, heartbeat messages and status messages. In one embodiment, the periodic message is a synchronous message, wherein a response is needed for the messages to continue. Alternatively, the periodic message is pseudo-synchronous, wherein initial messages are asynchronous and do not wait for responses while subsequent messages are synchronous and do wait for responses. Monitoring periodic messages is advantageous because threats that infiltrate a system will likely affect the timing of the periodic messages. Examples of disruptions to periodic messages as a result of infiltration include, but are not limited to, message delays, duplicate messages, timing shifts, modified messages, and restart of messaging procedures. The temporal module of the present invention is operable to recognize these disruptions while monitoring a web application and identify a potential threat as a cause.

The timing of periodic messages is also subject to variability due to non-harmful causes, including, but not limited to, connection issues, latency, bandwidth, network traffic, processing priority, and/or processing load. Therefore, accurately distinguishing true timing disruptions from regular variability requires a robust model. The time between periodic messages can be considered a stochastic variable that is described by a normal distribution. In one embodiment, the temporal module maintains a normal distribution of arrival times, or the elapsed time between arrival of periodic messages for each type of periodic message from a sender. In one embodiment, the timing module is operable to determine the standard deviation (a) of the normal model by learning from the timing data using an automatic configuration. Alternatively, the timing module receives a standard deviation as a data input in order to build the model. In one embodiment, the temporal module updates the model and its parameters (e.g., a mean, a standard deviation) periodically.

In one embodiment, the temporal module calculates a z-score for the arrival time of each incoming message to determine whether or not the arrival time is an outlier. In one embodiment, the z-score is calculated as $$z = \frac{|x-\mu|}{\sigma},$$

wherein x is the arrival time of the incoming message and μ is the average arrival time of the distribution. The absolute value of the z-score is used to force the normal distribution to be symmetrical. In a normal distribution, the z-score describes the distance between x (the observed value) and the mean as a number of standard deviations. In one embodiment, the temporal module uses an outlier threshold for z-scores to identify a timing disruption. The z-score is associated with a cumulative probability P of an observed value being less than x given the normal distribution and a complementary probability (1–P) of an observed value being greater than x given the normal distribution. In one embodiment, the probability is determined using a standard normal z-score table, which is a known statistical method in the art. In another embodiment, the temporal module is operable to calculate the probability using the equation $$P(x \le z) = \frac{1}{1+e^{-1.78206z}},$$

which is an approximation of the z-score table to fit standard normal data using a non-linear least-squares Levenberg-Marquardt algorithm. In one embodiment, the temporal module is operable to determine a temporal trust score based on the probability. In one embodiment, the temporal trust score is calculated as Trust=2*(1–P(z))

Proximity Analysis

In one embodiment, the proximity module of the present invention is operable to determine a distance between an external system communicating with the web application and a host system of the web application. In one embodiment, the distance is determined using a number of network hops and/or ping times. A network hop occurs when a packet of data passes through a network device (e.g., a router) that marks a network segment between a source and a destination. Network hops are consistent between successive messages from the same source, and a change in number of network hops indicates a change in the route taken from the source to the destination. Ping time is a measure of latency and the amount of time it takes for a message to travel from a source to a destination and back to the source. In one embodiment, the proximity module is operable to calculate a proximity score for each message. In one embodiment, the proximity score is not an absolute measure of distance or location; rather, it serves as a distinct, identifiable feature of the message that is dependent on measurable data and that is unique to a sender of the message. Using the proximity score as an abstract or relative metric is advantageous because it eliminates the need to interpret the score using detailed information about the geography and/or topology of the network. Additionally, ping times are not directly correlated to physical distance, as there are many factors such as latency and bandwidth that affect travel time for data; however, variations in ping times can indicate change in the source of a message. In one embodiment, the proximity module is operable to determine the proximity score based on tactical message headers and sender identifiers. In one embodiment, the proximity module includes a semantic analyzer and/or a context analyzer. Characterizing the proximity of a source using a statistically validated proximity score enables the proximity module to determine when a message's network path changes, suggesting a different source, e.g., a fraudulent actor in the system.

In one embodiment, the proximity module is operable to store proximity scores using a hashing function. A hashing function maps an input (e.g., a message source) to a hash. In one embodiment, the hash is the proximity score corresponding to the source. Alternatively, the hash is another value that is computed from the proximity score. Effective hashing functions minimize collisions, which occur when two different inputs result in the same hash. For example, two sources have a combination of network hops and ping times that result in the same proximity score. In one embodiment, the hashing function incorporates additional calculations to prevent the hashes for each source from being identical, e.g., a calculation that uses data about the source. In one embodiment, the proximity module uses a memory hashing function, wherein the hash for a source is the memory location where the proximity score for the source is stored. In one embodiment, the proximity module is operable to model proximity scores for each source using a normal distribution. The normal distribution accounts for variations, e.g., in ping time, which can be modeled as a stochastic variable. The proximity module is then operable to identify outliers in proximity scores, e.g., using a z-score. In one embodiment, the proximity module is operable to calculate a proximity trust score based on a proximity score, e.g., based on the z-score associated with the proximity score.

Firewall

In one embodiment, the system of the present invention implements at least one firewall, e.g., an application firewall. Network-based application firewalls (e.g., web application firewalls), which operate based on network protocols (e.g., HTTP), and host-based application firewalls are both compatible with the present invention. In one embodiment, the present invention is further operable to implement sandboxing to execute incoming code in an isolated, restricted environment in order to protect a host system. In one embodiment, the at least one firewall is operable to parse incoming data and use rules-based logic to filter malicious or unwanted traffic. In one embodiment, the at least one firewall is operable to use a semantic reasoning engine. The at least one firewall is operable to use positive security models and/or negative security models. In one embodiment, the at least one firewall is integrated into additional security features. Hardware and software, as well as physical and virtual, implementations of the at least one firewall are compatible with the present invention.

In one embodiment, the at least one firewall includes at least one blacklist and/or at least one whitelist to protect the application against known attack vectors. For example, networks where known nefarious actors have been discovered are added to a blacklist to prevent man-in-the-middle or alternative future attacks from those networks. In one embodiment, messages from networks on the blacklist are given a trust score of zero. Alternatively, the system is operable to maintain the at least one whitelist wherein a trust model is established based on users on the whitelist. In one embodiment, the system is operable to dynamically modify the at least one blacklist and/or the at least one whitelist using gathered intelligence. In one embodiment, the system does not blacklist or whitelist specific files or documents. Updating a blacklist or whitelist of specific files presents a potential vulnerability. Additionally, it is possible that a blacklist or whitelist of files is itself leaked, which could expose sensitive information about the system. In one embodiment, the system is operable to analyze an IP address using classless interdomain routing (CIDR) notation in order to blacklist an entire network. For example, the system uses a wildcard operator to blacklist any IP addresses with a certain prefix wherein the prefix identifies a network with known nefarious actors. In a non-limiting example, the system uses an access-control list (ACL) (e.g., a filesystem ACL, a portable operating system interface (POSIX) ACL, a Network File System version 4 (NFSv4) ACL, a network ACL) to control access to objects. NFSv4 ACLs are described in Network File System version 4, published by the Network Working Group on Feb. 15, 2006, which is incorporated herein by reference in its entirety. In an alternative embodiment, the system uses role-based access control (RBAC). Using ACLs enables user accounts in the system to modify permissions without administrator privileges, providing dynamic protection of applications and files through semantic access controls. One embodiment of semantic access control is described in *Semantic Access Control Model: A Formal Specification*, presented at the 10$^{th}$ European Symposium on Research in Computer Security in September 2005 and published in *Lecture Notes in Computer Science* in September 2005, which is incorporated herein by reference in its entirety.

In one embodiment, the present invention includes at least one daemon for running background security processes. In one embodiment, the at least one daemon is added to a host by a system administrator account. In one embodiment, the at least one daemon provides directory access control. In one embodiment, the at least one daemon is operable to continuously evaluate directory access and determine whether a user account needs access to a protected directory. In one embodiment, the at least one daemon is operable to determine if a user connection to the web application is local or remote, e.g., whether a user connection is using a secure shell (SSH) connection, a teletype (TTY) connection, or a pseudo TTY (PTTY) connection. In one embodiment, the at least one daemon is further operable to determine a proximity score of a remote user based on the IP address and/or a number of network hops. In one embodiment, the at least one daemon is operable to characterize a client's access behavior. For example, the at least one daemon is operable to create a model of login frequency by a client. The model includes statistical measures including, but not limited to, a mean, a variance, a z-score, a probability, a change over time, a fit, and/or an outlier. Access behavior is useful in identifying abnormal actors in a system and for granting safe access in a more efficient manner. A client that frequently accesses the system in a consistent manner is likely to be trustworthy, while a new client or a client that accesses the system in an erratic manner needs to be evaluated by a system administrator before being granted access or renewed access. In one embodiment, the system is operable to generate a firewall trust score based on how incoming data compares with the policies of the at least one firewall and/or the at least one daemon.

Trust Score

In one embodiment, each module of the system of the present invention is operable to produce a trust score, including, but not limited to, an operational trust score, a command structure trust score, a temporal trust score, a proximity trust score, and/or a firewall trust score. In one embodiment, a scoring engine is operable to generate a trust score based on at least one of the aforementioned module trust scores. In one embodiment, the trust score is a probability that falls between 0 and 1. For example, the trust score is the conditional probability that an incoming message is a security threat given each of the module trust scores. In one embodiment, the scoring engine assumes that the trust scores from the modules are conditionally independent of each other, enabling the use of a Naïve Bayesian classifier to determine the probability that a message is safe or suspect based on conditional probability. In practice, this assumption does not result in operational error. The Bayesian method for determining a conditional probability P of scenario C given condition(s) x is:

$$P(C \mid x) = \frac{P(C) * P(x \mid C)}{P(x)}$$

The scoring engine is operable to determine the probability that a message is safe given x trust score(s) ($P(C_{safe}|x)$) and/or the probability that a message is suspect given x trust score(s) ($P(C_{sus}|x)$). In one embodiment, the scoring engine is operable to classify the message based on whether $P(C_{safe}|x)$ or $P(C_{sus}|x)$ is a greater posterior probability. In one embodiment, $P(C_{safe}|x)$ and $P(C_{sus}|x)$ wherein x is the accumulation of module trust scores ($x_{prox}$, $x_{command}$, $x_{temp}$, $x_{oper}$, $x_{fire}$) from the proximity, command structure, temporal, operational, and firewall modules, respectively, are calculated using the following equations:

$$P(C_{safe} \mid x) = \frac{P(C_{safe})P(x_{prox} \mid C_{safe})P(x_{command} \mid C_{safe})P(x_{temp} \mid C_{safe})P(x_{oper} \mid C_{safe})P(x_{fire} \mid C_{safe})}{\sum_{i=1}^{n} P(C_i)P(x \mid C_i)}$$

$$P(C_{sus} \mid x) = \frac{P(C_{sus})P(x_{prox} \mid C_{sus})P(x_{command} \mid C_{sus})P(x_{temp} \mid C_{sus})P(x_{oper} \mid C_{sus})P(x_{fire} \mid C_{sus})}{\sum_{i=1}^{n} P(C_i)P(x \mid C_i)}$$

Any combination and number of trust scores is compatible with the present invention. For example, in one embodiment, the scoring engine only uses the operational trust score to assess an incoming message. In an alternative example, the scoring engine uses the operational trust score, the temporal trust score, and the firewall trust score to assess an incoming message. In one embodiment, the scoring engine selects which trust scores to use based on a pattern of trust scores over time. Alternatively, the scoring engine selects which trust scores to use based on an outlier determination, e.g., using a threshold. Given that the denominators for each calculation $P(C_{safe}|x)$ and $P(C_{sus}|x)$ are the same, they do not affect the comparison between the two probabilities. In one embodiment, the scoring engine does not calculate the denominator in order to classify the incoming message as safe or suspect. However, the denominators are necessary for normalizing the posterior probability determined by the equation to a value between 0 and 1. Thus, in an alternative embodiment, the scoring engine does calculate the denominator in order to report a proper probability. Advantageously, the scoring engine is operable to characterize an incoming message as acceptable or unacceptable based on its potential interaction with the application. The scoring engine does not need to recognize a signature or a fingerprint of the incoming message or used a prescriptive, rules-based policy (e.g., a playbook) to identify the incoming message.

In one embodiment, the scoring engine does not use training data in order to calculate probabilities and/or classify incoming messages. Training data is not always available, especially for new systems. However, training data is often used for effective Bayesian calculations (e.g., the Naïve Bayesian classifier) given the dependency on prior probabilities. In one embodiment, the scoring engine uses a weighted product of module trust scores to determine an overall trust score rather than using conditional probabilities. For example, a probability of an incoming message being trustworthy P(trust) for k module trust scores is calculated by the following equation:

$$P(\text{trust}) = \prod_{i=1}^{k} w_i x_i$$

wherein $x_i$ is a module trust score and $w_i$ is the corresponding weight of the module trust score. In one embodiment, the weights are provided in a configuration file. The probability of trust is used to classify the incoming message as safe or suspect.

The present invention includes systems and methods for cybersecurity, and specifically for identifying incoming digital data (e.g., requests, messages) to an application as trustworthy or untrustworthy. Cybersecurity is a significant issue in computing, and it is estimated that nearly 50% of data breaches in the 2010s originated at the web application layer. The applications characterized by the system are pieces of software that interact with end users to execute functions of data transmission and presentation. These applications are built for computers and networked systems; thus, the systems and methods of the present invention are directed to solving issues inherent to computer systems. These systems and methods include inspecting incoming data for semantic and contextual analysis as well as modeling of metadata, such as temporal characteristics and proximity. Determining these metrics and modeling them in real time or near real time in the context of ongoing traffic in complex network systems could not reasonably be performed by hand. In addition, the present invention characterizes an interaction between the incoming data and an application to detect acceptable and unacceptable state changes in the application that occur as a result of software executing. These processes, including the execution of software for an application, do not have pre-Internet or pre-computing analogs.

Figure 9:
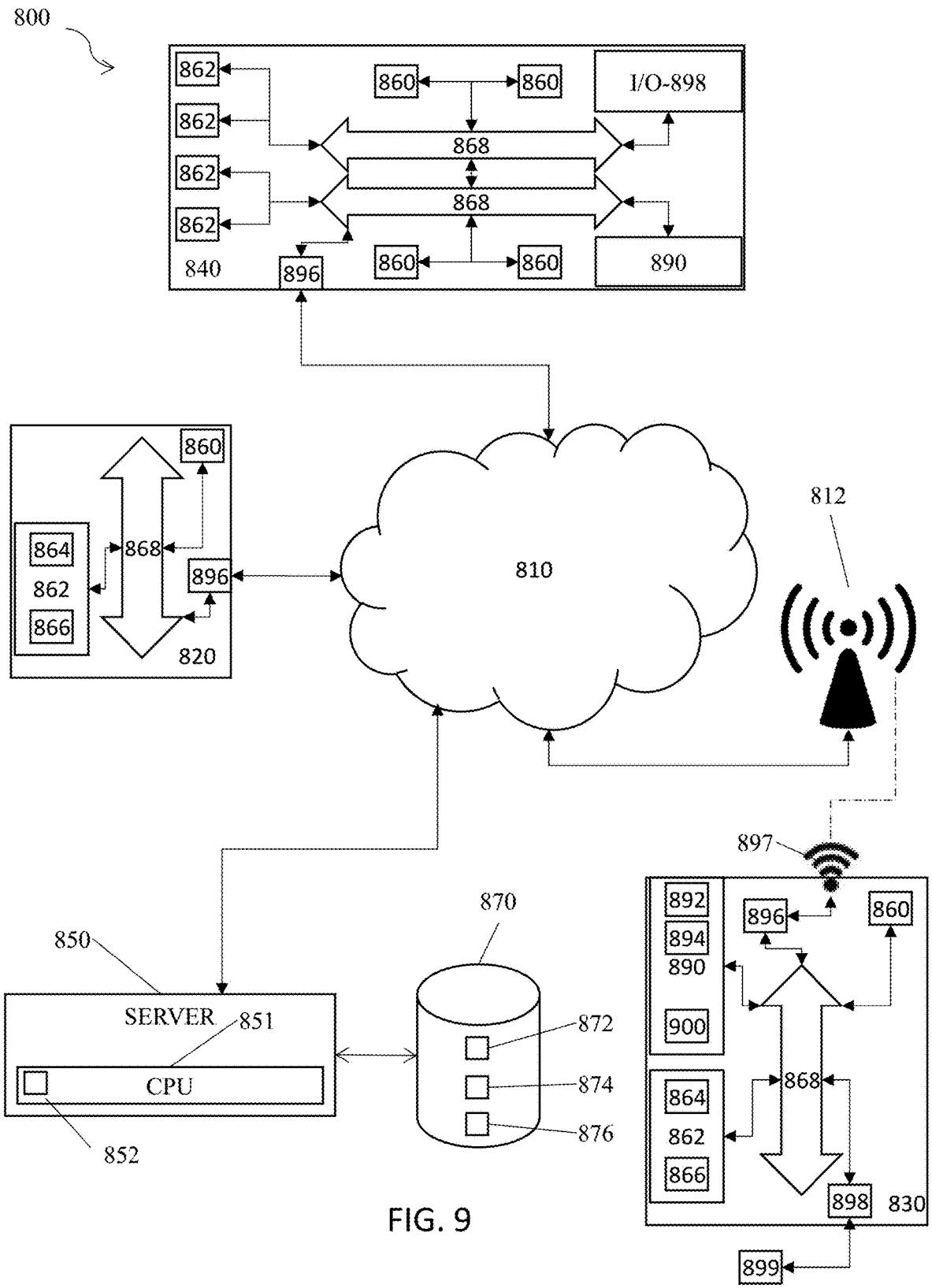
FIG. 9 is a schematic diagram of an embodiment of the invention.

FIG. 9 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 9, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 9, is operable to include other components that are not explicitly shown in FIG. 9, or is operable to utilize an architecture completely different than that shown in FIG. 9. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The security system of the present invention is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The system is operable to use any of the aforementioned learning techniques alone or in combination.

Further, the system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The system is preferably operable to recommend and/or perform actions based on historical data, external data sources, ML, AI, NNs, and/or other learning techniques. The system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. For example, alternative embodiments of any of the modules described herein are operable to implement a form of machine learning or artificial intelligence to update a model, a scoring mechanism, and/or a probability based on training data and/or new data. All modifications and improvements have been deleted herein for the sake of conciseness and readability but are properly within the scope of the present invention.

The invention claimed is:

1. A system for protecting a web-enabled application, comprising:
    at least one server computer including a processor, a memory, and at least one database;
    an automated and dynamic access control (ADAC) tool; and
    at least one scoring engine;
    wherein the ADAC tool uses at least one module to monitor web/internet traffic, Internet of Things (IoT) traffic, and/or bus traffic;
    wherein the at least one module includes a proximity module, a temporal module, a command structure module, an operational module, and/or a consistency module;
    wherein one or more the at least one module is operable to determine at least one trust score for an application and/or incoming data;
    wherein the operational module is operable to use a configuration file to create at least one Hidden Markov model (HMM); and
    wherein the consistency module is operable to use a specification of byte offsets and lengths within specific message types to check for static or dynamic consistency.

2. The system of claim 1, wherein the operational module uses the at least one HMM to describe off-nominal behavior within the web-enabled application.

3. The system of claim 1, wherein the at least one scoring engine is operable to generate an overall trust score based on one or more of the at least one trust score.

4. The system of claim 1, wherein the operational module uses the at least one HMM to determine if a message coming into the web-enabled application is malicious.

5. The system of claim 1, wherein the command structure module is operable to determine an echelon chain of command for messages coming into the web-enabled application.

6. The system of claim 1, wherein the temporal module maintains a normal distribution of arrival times, or elapsed times between arrival of periodic messages from a sender.

7. The system of claim 1, wherein the proximity module is operable to calculate a proximity score for a message coming into the web-enabled application, wherein the proximity score serves as a distinct identifiable feature of the message coming into the web-enabled application.

8. The system of claim 1, wherein the proximity module is operable to store proximity scores using a hashing function.

9. The system of claim 1, further including a firewall module, wherein the firewall module maintains at least one firewall.

10. The system of claim 1, wherein at least one user interface is used to accept, build, and/or update the configuration file.

* * * * *